US007358999B2

(12) United States Patent
Ikeda

(10) Patent No.: US 7,358,999 B2
(45) Date of Patent: Apr. 15, 2008

(54) FOCUS SENSING APPARATUS, FOCUS SENSING METHOD USING PHASE-DIFFERENTIAL DETECTION AND COMPUTER-READABLE STORAGE MEDIUM THEREFOR

(75) Inventor: Masato Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 711 days.

(21) Appl. No.: 10/842,444

(22) Filed: May 11, 2004

(65) Prior Publication Data

US 2004/0207747 A1 Oct. 21, 2004

Related U.S. Application Data

(63) Continuation of application No. 09/264,153, filed on Mar. 5, 1999, now abandoned.

(30) Foreign Application Priority Data

Mar. 10, 1998 (JP) ................................ 10-057836
Mar. 10, 1998 (JP) ................................ 10-057837
Mar. 10, 1998 (JP) ................................ 10-057838
Mar. 10, 1998 (JP) ................................ 10-057839

(51) Int. Cl.
*H04N 5/232* (2006.01)
*H04N 5/238* (2006.01)
*H04N 5/217* (2006.01)
*G03B 3/10* (2006.01)
*G03B 3/00* (2006.01)

(52) U.S. Cl. ...................... 348/349; 348/366; 348/241; 396/122; 396/128

(58) Field of Classification Search ................ 348/345, 348/349, 350, 366, 241; 396/100, 122, 128
See application file for complete search history.

(56) References Cited

U.S. PATENT DOCUMENTS

| | | | | |
|---|---|---|---|---|
| 5,784,655 | A * | 7/1998 | Akashi et al. | 396/128 |
| 5,818,052 | A | 10/1998 | Elabd | |
| 5,949,483 | A | 9/1999 | Fossum et al. | |
| 5,995,144 | A | 11/1999 | Sasakura | |
| 6,169,855 | B1 | 1/2001 | Nakahara et al. | |
| 6,369,854 | B2 | 4/2002 | Ishida et al. | |
| 6,473,126 | B1 | 10/2002 | Higashihara et al. | |
| 6,496,225 | B1 * | 12/2002 | Higashihara et al. | 348/349 |
| 6,577,344 | B2 * | 6/2003 | Kadohara et al. | 348/350 |

FOREIGN PATENT DOCUMENTS

| | | | |
|---|---|---|---|
| JP | 09-043507 | * | 2/1997 |
| JP | 9-43507 | | 6/1997 |

* cited by examiner

*Primary Examiner*—Nhan T. Tran
(74) *Attorney, Agent, or Firm*—Morgen & Finnegan LLP

(57) ABSTRACT

An apparatus comprising: an image sensing device having a plurality of pixels for receiving light from an object upon separating the light into respective ones of different color components; an optical guidance device for accepting light rays in different directions from the same part of the object and guiding the light rays to the image sensing device; and a phase-difference determining device for determining a phase difference in an output signal of the image sensing device with respect to each of the light rays accepted in the different directions by the optical guidance device, determination being performed based upon a signal obtained by combining output signals of pixels, among the plurality of pixels, that correspond to prescribed different color components.

27 Claims, 21 Drawing Sheets

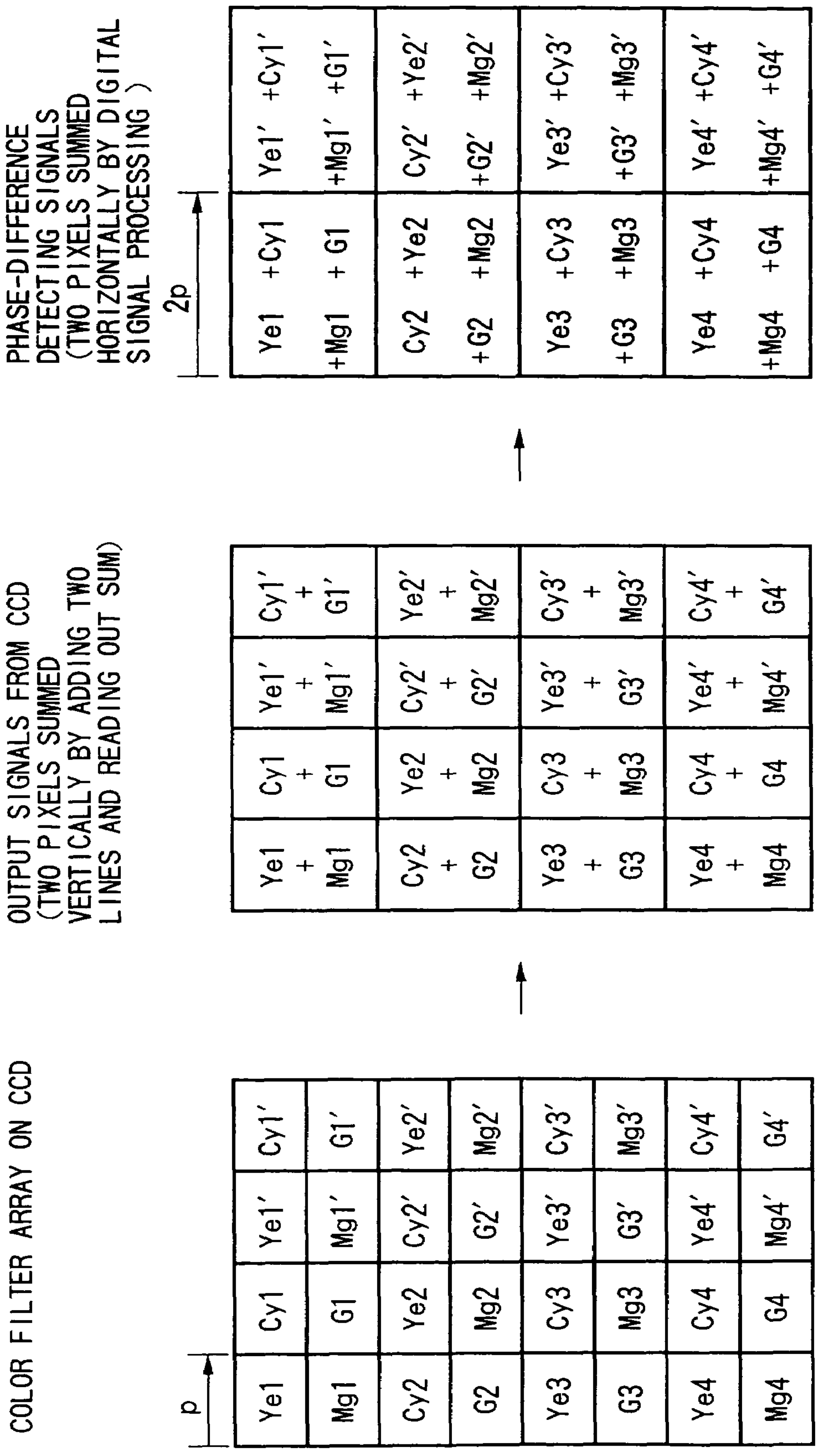

COLOR FILTER ARRAY ON CCD

| Ye1 | Mg1 | Cy2 | G2 | Ye3 | G3 | Ye4 | Mg4 |
|-----|-----|-----|-----|-----|-----|-----|-----|
| Cy1 | G1 | Ye2 | Mg2 | Cy3 | Mg3 | Cy4 | G4 |
| Ye1' | Mg1' | Cy2' | G2' | Ye3' | G3' | Ye4' | Mg4' |
| Cy1' | G1' | Ye2' | Mg2' | Cy3' | Mg3' | Cy4' | G4' |

← p →

OUTPUT SIGNALS FROM CCD (TWO PIXELS SUMMED VERTICALLY BY ADDING TWO LINES AND READING OUT SUM)

| Ye1 + Mg1 | Cy2 + G2 | Ye3 + G3 | Ye4 + Mg4 |
|-----------|----------|----------|-----------|
| Cy1 + G1 | Ye2 + Mg2 | Cy3 + Mg3 | Cy4 + G4 |
| Ye1' + Mg1' | Cy2' + G2' | Ye3' + G3' | Ye4' + Mg4' |
| Cy1' + G1' | Ye2' + Mg2' | Cy3' + Mg3' | Cy4' + G4' |

PHASE-DIFFERENCE DETECTING SIGNALS (TWO PIXELS SUMMED HORIZONTALLY BY DIGITAL SIGNAL PROCESSING)

| Ye1 +Mg1 | Cy1 + G1 | Ye2 +Mg2 | Cy2 +Ye2 +G2 +Mg2 | Ye3 +G3 | Cy3 +Ye3 +Mg3 +G3 | Ye4 +Mg4 | Cy4 +Ye4 +G4 +Mg4 |

(Table structure is:)

| Ye1 +Mg1 | Ye1 +Cy1 +Mg1 +G1 | Cy2 +G2 | Cy2 +Ye2 +G2 +Mg2 | Ye3 +G3 | Ye3 +Cy3 +G3 +Mg3 | Ye4 +Mg4 | Ye4 +Cy4 +Mg4 +G4 |
|----------|-------------------|---------|-------------------|---------|-------------------|----------|-------------------|
| Cy1 +G1 | Ye1' +Cy1' +Mg1' +G1' | Ye2 +Mg2 | Cy2' +Ye2' +G2' +Mg2' | Cy3 +Mg3 | Ye3' +Cy3' +G3' +Mg3' | Cy4 +G4 | Ye4' +Cy4' +Mg4' +G4' |

← 2p →

PHASE-DIFFERENCE DETECTING SIGNALS (TWO PIXELS SUMMED HORIZONTALLY BY DIGITAL SIGNAL PROCESSING)

OUTPUT SIGNALS FROM CCD (TWO PIXELS SUMMED VERTICALLY BY ADDING TWO LINES AND READING OUT SUM)

COLOR FILTER ARRAY ON CCD

FIG.8A

COLOR FILTER ARRAY ON CCD p

| | | | |
|---|---|---|---|
| Ye1 | Cy1 | Ye1′ | Cy1′ |
| Mg1 | G1 | Mg1′ | G1′ |
| Cy2 | Ye2 | Cy2′ | Ye2′ |
| G2 | Mg2 | G2′ | Mg2′ |
| Ye3 | Cy3 | Ye3′ | Cy3′ |
| G3 | Mg3 | G3′ | Mg3′ |
| Ye4 | Cy4 | Ye4′ | Cy4′ |
| Mg4 | G4 | Mg4′ | G4′ |

OUTPUT SIGNALS FROM CCD (FOUR PIXELS SUMMED VERTICALLY BY ADDING FOUR LINES AND READING OUT SUM)

| | | | |
|---|---|---|---|
| Ye1 + Mg1 + Cy2 + G2 | Cy1 + G1 + Ye2 + Mg2 | Ye1′ + Mg1′ + Cy2′ + G2′ | Cy1′ + G1′ + Ye2′ + Mg2′ |
| Ye3 + G3 + Ye4 + Mg4 | Cy3 + Mg3 + Cy4 + G4 | Ye3′ + G3′ + Ye4′ + Mg4′ | Cy3′ + Mg3′ + Cy4′ + G4′ |

PHASE-DIFFERENCE DETECTING SIGNALS (TWO PIXELS SUMMED HORIZONTALLY BY DIGITAL SIGNAL PROCESSING )

2p

| | |
|---|---|
| Ye1 +Cy1 +Mg1 + G1 +Cy2 +Ye2 +G2 +Mg2 | Ye1′ +Cy1′ +Mg1′ +G1′ +Cy2′ +Ye2′ +G2′ +Mg2′ |
| Ye3 +Cy3 +G3 +Mg3 +Ye4 +Cy4 +Mg4 +G4 | Ye3′ +Cy3' +G3′ +Mg3′ +Ye4′ +Cy4′ +Mg4′ +G4′ |

COLOR FILTER ARRAY ON CCD

OUTPUT SIGNALS FROM CCD (FOUR PIXELS SUMMED VERTICALLY BY ADDING FOUR LINES AND READING OUT SUM)

PHASE-DIFFERENCE DETECTING SIGNALS (TWO PIXELS SUMMED HORIZONTALLY BY DIGITAL SIGNAL PROCESSING )

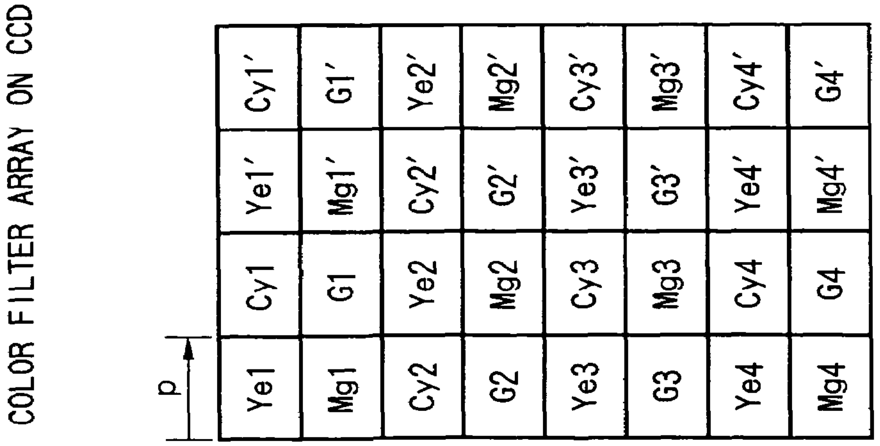

FIG.10A

COLOR FILTER ARRAY ON CCD

| Ye1 | Mg1 | Cy2 | G2 | Ye3 | G3 | Ye4 | Mg4 |
|---|---|---|---|---|---|---|---|
| Cy1 | G1 | Ye2 | Mg2 | Cy3 | Mg3 | Cy4 | G4 |
| Ye1' | Mg1' | Cy2' | G2' | Ye3' | G3' | Ye4' | Mg4' |
| Cy1' | G1' | Ye2' | Mg2' | Cy3' | Mg3' | Cy4' | G4' |

p

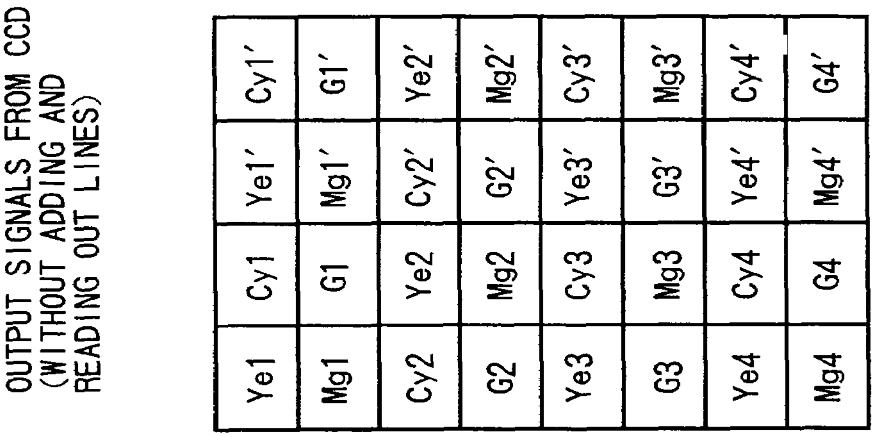

FIG.10B

OUTPUT SIGNALS FROM CCD (WITHOUT ADDING AND READING OUT LINES)

| Ye1 | Mg1 | Cy2 | G2 | Ye3 | G3 | Ye4 | Mg4 |
|---|---|---|---|---|---|---|---|
| Cy1 | G1 | Ye2 | Mg2 | Cy3 | Mg3 | Cy4 | G4 |
| Ye1' | Mg1' | Cy2' | G2' | Ye3' | G3' | Ye4' | Mg4' |
| Cy1' | G1' | Ye2' | Mg2' | Cy3' | Mg3' | Cy4' | G4' |

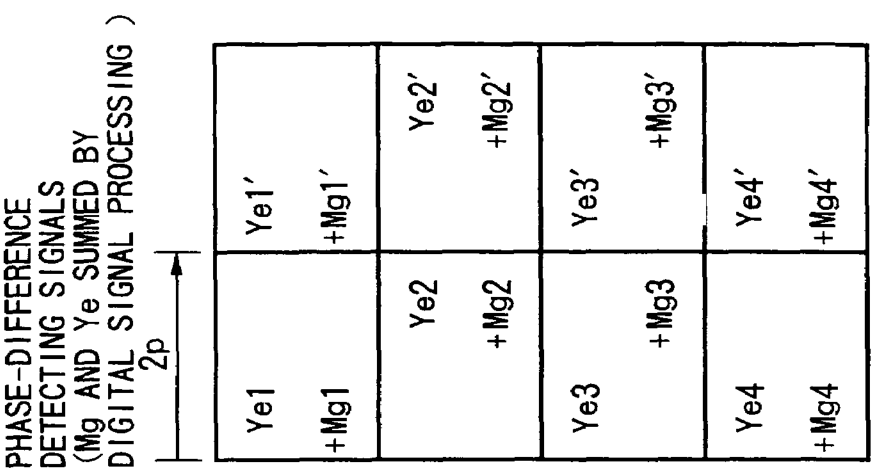

FIG.10C

PHASE-DIFFERENCE DETECTING SIGNALS (Mg AND Ye SUMMED BY DIGITAL SIGNAL PROCESSING)

| Ye1 +Mg1 | Ye2 +Mg2 | Ye3 +Mg3 | Ye4 +Mg4 |
|---|---|---|---|
| Ye1' +Mg1' | Ye2' +Mg2' | Ye3' +Mg3' | Ye4' +Mg4' |

2p

PHASE – DIFFERENCE DETECTING SIGNALS BEFORE DOWNSAMPLING

SIGNALS AFTER DOWNSAMPLING (SHADED PORTIONS)

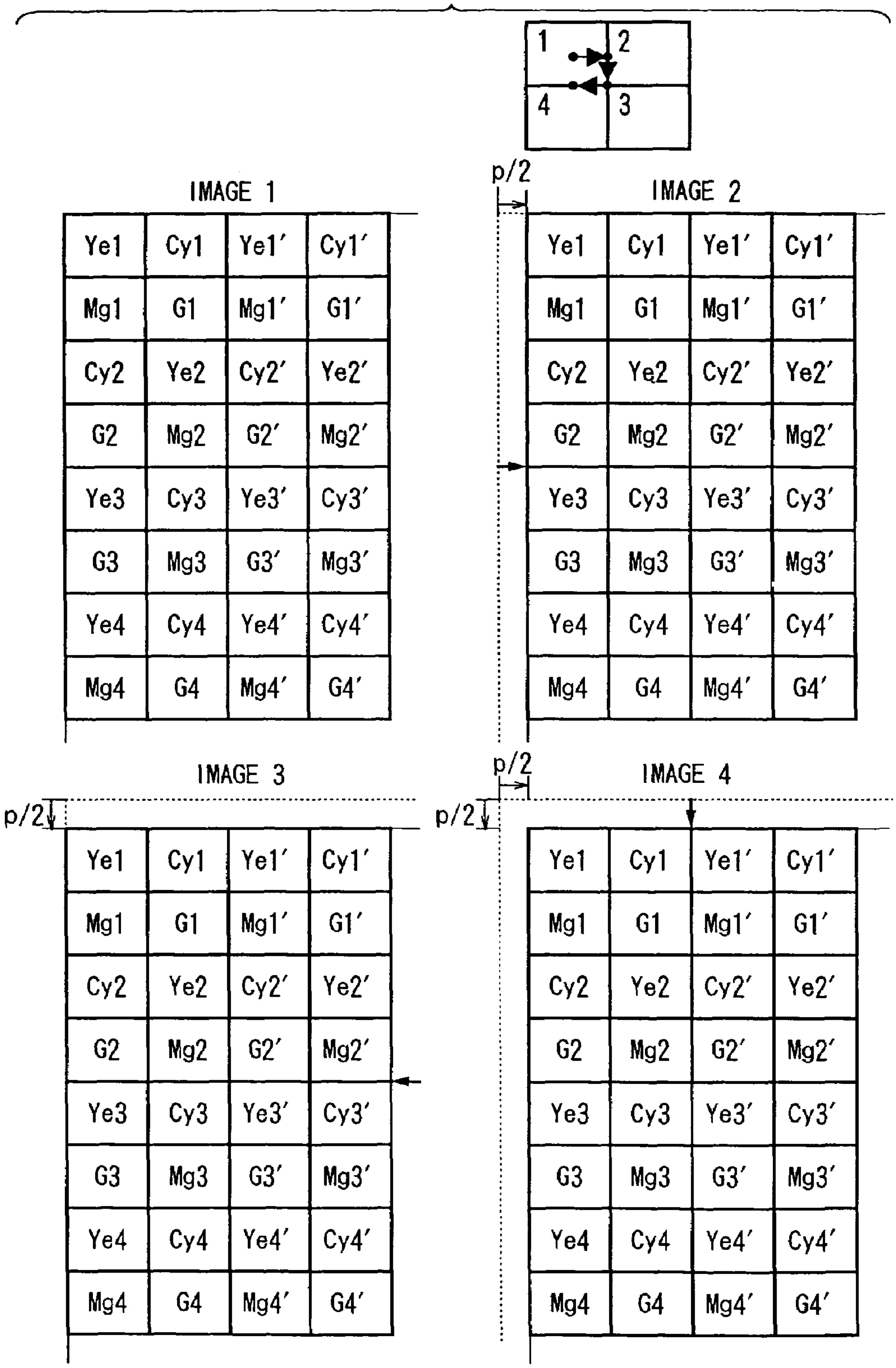

FIG.18

| IMAGE 1 | | | |
|---|---|---|---|
| Ye1 | Cy1 | Ye1' | Cy1' |
| Mg1 | G1 | Mg1' | G1' |
| Cy2 | Ye2 | Cy2' | Ye2' |
| G2 | Mg2 | G2' | Mg2' |
| Ye3 | Cy3 | Ye3' | Cy3' |
| G3 | Mg3 | G3' | Mg3' |
| Ye4 | Cy4 | Ye4' | Cy4' |
| Mg4 | G4 | Mg4' | G4' |

| IMAGE 2 | | | |
|---|---|---|---|
| Ye1 | Cy1 | Ye1' | Cy1' |
| Mg1 | G1 | Mg1' | G1' |
| Cy2 | Ye2 | Cy2' | Ye2' |
| G2 | Mg2 | G2' | Mg2' |
| Ye3 | Cy3 | Ye3' | Cy3' |
| G3 | Mg3 | G3' | Mg3' |
| Ye4 | Cy4 | Ye4' | Cy4' |
| Mg4 | G4 | Mg4' | G4' |

| IMAGE 3 | | | |
|---|---|---|---|
| Ye1 | Cy1 | Ye1' | Cy1' |
| Mg1 | G1 | Mg1' | G1' |
| Cy2 | Ye2 | Cy2' | Ye2' |
| G2 | Mg2 | G2' | Mg2' |
| Ye3 | Cy3 | Ye3' | Cy3' |
| G3 | Mg3 | G3' | Mg3' |
| Ye4 | Cy4 | Ye4' | Cy4' |
| Mg4 | G4 | Mg4' | G4' |

| IMAGE 4 | | | |
|---|---|---|---|
| Ye1 | Cy1 | Ye1' | Cy1' |
| Mg1 | G1 | Mg1' | G1' |
| Cy2 | Ye2 | Cy2' | Ye2' |
| G2 | Mg2 | G2' | Mg2' |
| Ye3 | Cy3 | Ye3' | Cy3' |
| G3 | Mg3 | G3' | Mg3' |
| Ye4 | Cy4 | Ye4' | Cy4' |
| Mg4 | G4 | Mg4' | G4' |

IN-FOCUS STATE

FRONT-FOCUSED STATE

REAR-FOCUSED STATE

FOCUS SENSING APPARATUS, FOCUS SENSING METHOD USING PHASE-DIFFERENTIAL DETECTION AND COMPUTER-READABLE STORAGE MEDIUM THEREFOR

This application is a continuation of prior application Ser. No. 09/264,153, filed Mar. 5, 1999, which was abandoned.

BACKGROUND OF THE INVENTION

1. Field of the Invention

This invention relates to a focus sensor using phase-differential detection for an imaging device, which uses an image sensing element, of a digital camera or the like, a method of sensing focus by using phase-differential detection and a computer-readable storage medium for such method.

2. Description of Related Art

A large number of focus sensors that rely upon phase-differential detection are available as auto focus devices used in traditional single-lens reflex silver-halide cameras.

FIG. 19 is a sectional view showing a single-lens reflex camera having such a focus sensor using phase-differential detection according to the prior art. A ray bundle 109*a* emergent from a taking lens 100 is split into a ray bundle 109*b* by reflection at a main mirror 102 comprising half-mirror and a ray bundle 109*e* obtained by transmission through the main mirror 102. The reflected ray bundle 109*b* forms the image of a subject on the diffusing surface of a focusing plate 103. The photographer is capable of observing the image of the subject on the focusing plate 103 via eyepieces 105*a*, 105*b* and a pentagonal prism 104.

The ray bundle 109*e* obtained by transmission through the main mirror 102 is reflected by a sub mirror 106 and introduced to a focus sensor 107. The latter senses the state of focus (the amount of defocusing) of the taking lens 100 with respect to a silver-salt emulsion film 108 by a ray bundle 109*f* from the taking lens 100.

If it is determined that the amount of defocusing sensed is greater than a predetermined range of focuses and is indicative of a defocused state, a focusing lens of the taking lens 100 is driven so as to eliminate the amount of sensed defocusing, whereby focusing is achieved.

Focus sensing processing in the conventional focus sensor will be described with reference to FIGS. 20A to 20C and FIGS. 21A to 21C. FIG. 20A illustrates the in-focus state. Here ray bundles 116*a*, 116*b* that have passed through two different pupils of the taking lens 100 form an image on a primary imaging plane 114, and the subject image on the primary imaging plane is formed again on a sensor plane 113 on which two line sensors 113*a*, 113*b* are disposed, by secondary image forming lenses 112*a*, 112*b*, respectively. A field lens 111 is placed in the vicinity of the primary imaging plane 114 of the taking lens 100 and introduces a pencil of rays of a prescribed image height to the sensor plane in an efficient manner to prevent a decline in quantity of light caused by an increase in image height.

In general, diaphragms (not shown) are placed directly in front of or directly in back of the secondary image forming lenses 112*a*, 112*b* to limit the two ray bundles 116*a*, 116*b* that have passed through the different pupils of the taking lens 100. The taking lens 100 does not possess a member for pupil partitioning.

Since the two images formed on the line sensors 113*a*, 113*b* are the result of ray bundles that have passed through different pupils, the relative positions of the images differ depending upon the amount of lens movement and result in an in-focus state, front-focused state or rear-focused state, as illustrated in FIGS. 20A to 20C and FIGS. 21A to 21C.

In FIGS. 20A and 21A, the spacing between the two images formed on the line sensors 113*a*, 113*b* in the in-focus state is equal to the relative distance e0 between the two line sensors and is constant at all times in the in-focus state.

In FIGS. 20B and 21B, spacing e1 between the two images is less than e0 in the front-focused state where the amount of defocusing is d1. If the defocusing amount d1 is increased, a difference δ1 between e0 and e1 also increases.

In FIGS. 20C and 21C, spacing e2 between the two images is greater than e0 in the rear-focused state where the amount of defocusing is d2. If the defocusing amount d2 is increased, a difference δ2 between e2 and e0 also increases.

Thus, the amount of defocusing and the direction thereof can be determined from the spacing between the two images. The difference between the two images in the currently defocused state and the reference spacing e0 in the in-focus state, namely the amount of relative shift (phase difference) between the two images given by $\delta = e - e0$, is calculated by obtaining the correlation between the output signals of the two line sensors 113*a*, 113*b*. The amount defocusing of the optical system and the direction of this defocusing are found from the phase difference and the focusing lens is controlled accordingly to achieve the in-focus state.

When this auto focus scheme is used in an image sensing device that employs an image sensing element for photography in a video camera or digital camera as disclosed in the specification of Japanese Patent Application Laid-Open No. 9-43507, there is no need to provide a light-receiving sensor for phase-difference detection, as in the above-mentioned silver-halide camera, and the image sensing element can be used as the light-receiving sensor for auto3507, there is no need to provide a light-receiving sensor for phase-difference detection, as in the above-mentioned silver-halide camera, and the image sensing element can be used as the light-receiving sensor for auto focus.

If the image sensing element is for black and white, the output of the element is the luminance signal representing the image of the received light. No problems arise, therefore, since the output obtained is similar to that of the auto focus sensor for the aforesaid silver-halide camera. However, if image sensing elements are for color, luminance signals classified according to prescribed color components are output from respective ones of the image sensing elements. Consequently, depending upon the color of the subject imaged, it is not possible to detect the phase difference of the image of the received light.

Further, if the image sensing element for taking pictures is used also as a li if image sensing elements are for color, luminance signals for color, luminance signals classified according to prescribed color components are output from respective ones of the image sensing elements. Consequently, depending upon the color of the subject imaged, it is not possible to detect the phase difference of the image of the received light.

Further, if the image sensing element for taking pictures is used also as a light-receiving sensor for detection of phase difference, the output of the image sensing element is subjected to prescribed image processing such as a gamma correction to obtain an image signal for photography. Consequently, if it is attempted to detect phase difference using the image signal to which such processing has been applied, auto focus speed slows down because such processing takes time.

SUMMARY OF THE INVENTION

According to one aspect of the present invention, there is provided an apparatus comprising: an image sensing device having a plurality of pixels for receiving light from an object upon separating the light into respective ones of different color components; an optical guidance device for accepting light rays in different directions from the same part of the object and guiding the light rays to the image sensing device; and a phase-difference determining device for determining a phase difference in an output signal of the image sensing device with respect to each of the light rays accepted in the different directions by the optical guidance device, determination being performed based upon a signal obtained by combining output signals of pixels, among the plurality of pixels, that correspond to prescribed different color components; wherein phase difference can be detected properly irrespective of the color of the object even in cases where an image sensing element for color is used as a sensor for detecting phase difference.

According to another aspect of the present invention, there is provided an apparatus comprising: an image sensing device for receiving light from an object; a signal processor for processing an output signal of the image sensing device, which has received the light from the object, to an image signal for photography; an optical guidance device for accepting light rays in different directions from the same part of the object and guiding the light rays to the image sensing device; and a phase-difference determining device for determining a phase difference in an output signal of the image sensing device with respect to each of the light rays accepted in the different directions by the optical guidance device, determination being performed based upon an output signal of the image sensing device not subjected to the processing by the signal processor; wherein there is no slow-down in phase-difference detection speed even in cases where an image sensing device for photography is used as a sensor for detecting phase difference.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 6A to 6C are diagrams useful in describing processing when a phase-difference detecting signal is obtained (here the pitch of phase-difference signals is two pixels of the CCD);

FIGS. 8A to 8C are diagrams useful in describing processing when a phase-difference detecting signal is obtained in a case where the subject is dark and sensitivity necessary for sensing phase difference cannot be obtained (here the pitch of phase-difference signals is two pixels of the CCD);

FIGS. 10A to 10C are diagrams useful in describing processing when a phase-difference detecting signal is obtained in a case where auxiliary light is used;

FIG. 18 is a diagram for describing shifting of pixels;

DESCRIPTION OF THE PREFERRED EMBODIMENT

Figure 1:
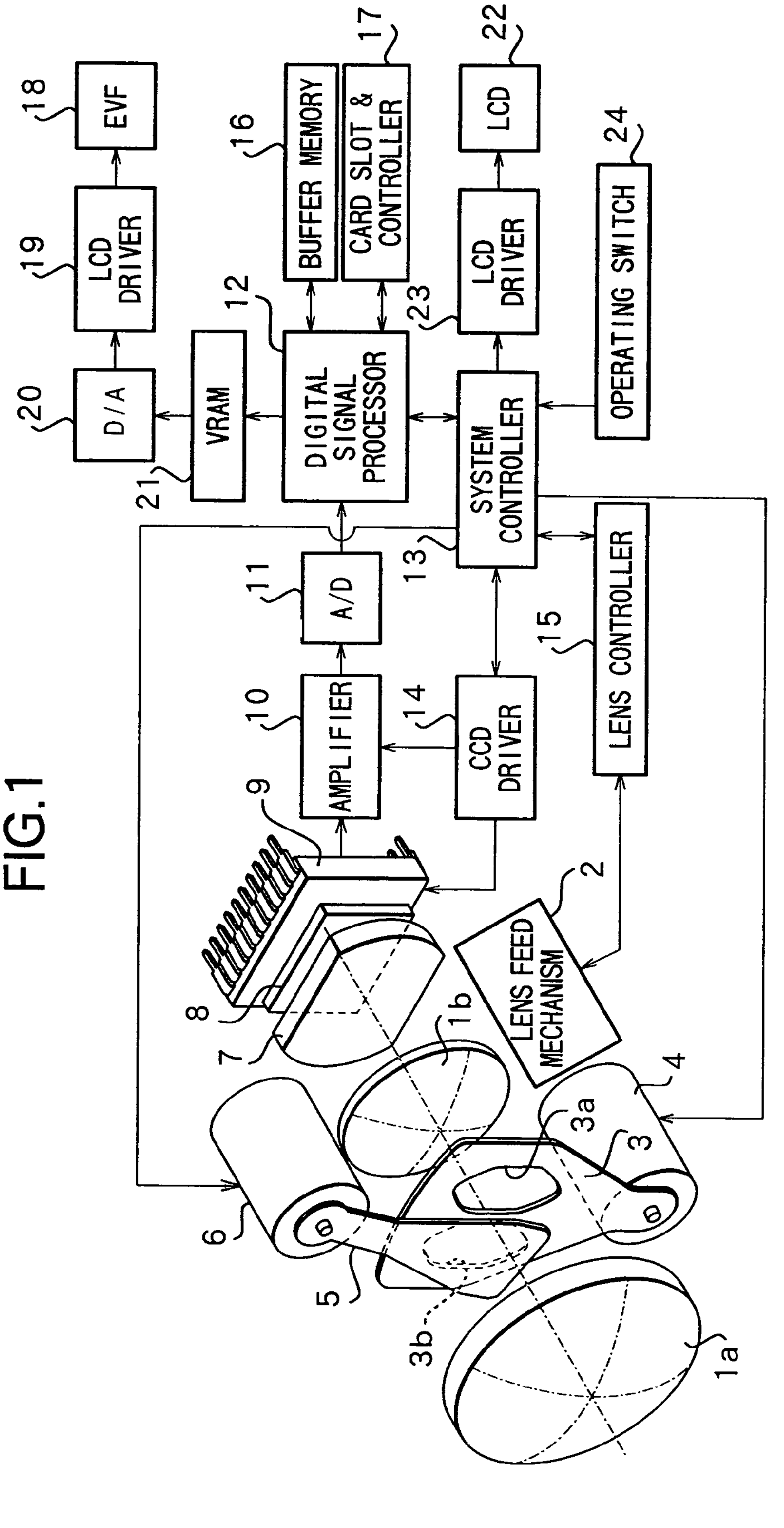
FIG. 1 is a diagram showing the construction of a focus sensing apparatus according to the present invention as well as the manner in which a camera uses this apparatus.

FIG. 1 is a diagram showing the construction of a focus sensing apparatus according to the present invention as well as the manner in which a camera uses this apparatus. Shown in FIG. 1 is a focusing lens group 1*b* of a taking lens, a lens group 1*a* other than the focusing lens group 1*b*, and a lens feed mechanism 2 for feeding the focusing lens group 1*b*. The mechanism 2 includes a motor for moving the lens. Also shown are a focus sensing diaphragm 3 having two apertures 3*a*, 3*b*, a motor 4 for inserting the focus sensing diaphragm 3 in the optical path, a light shield 5 for shielding either of the apertures 3*a*, 3*b* of the focus sensing diaphragm 3 from light, a motor 6 for moving the light shield 5, an optical low-pass filter 7, an infrared blocking filter 8, and a CCD 9 serving as an image sensing element for photoelectrically converting an optical image, which has been formed on its imaging surface, to an electric signal. A color filter shown in FIG. 6A and described later is provided on the imaging surface of the CCD 9.

An amplifier 10 is for amplifying the output of the CCD 9, and an A/D converter 11 converts, to digital data, the analog signal amplified at a prescribed gain by the amplifier 10. A digital signal processor 12 subjects the digital signal from the A/D converter 11 to various digital signal processing, a system controller 13 performs overall control of the camera, and a CCD driver 14 controls driving of the CCD 9 and sets the amplification factor of the amplifier 10. A lens controller 15 controls the movement of the focusing lens group 1*b*.

A buffer memory 16 such as a DRAM is used when temporarily storing the digital signal, by way of example. Numeral 17 denotes a card slot and control to which a recording medium and function card, etc., are connected, and 18 an electronic viewfinder (EVF) whose liquid crystal display (LCD) is driven a driver 19. A D/A converter 20 is for sending an analog signal to the driver 19. A VRAM 21 retains an image displayed on the electronic viewfinder 18 and outputs a digital signal to the D/A converter 20. An external monochromatic liquid crystal device (LCD) 22 displays camera settings and the like, and an LCD driver 23 drives the display of this LCD. An operating switch 24 is for setting the taking mode of the camera and for sensing a release operation.

A description primarily of the focus sensing method and focus sensing apparatus directly related to the present invention will now be rendered with reference to FIG. 1.

Assume that the power has been introduced to the camera and that the camera is capable of photography. In order to perform pupil time-sharing phase-differential auto focusing, the focus sensing diaphragm 3 has the two identically shaped apertures side by side in the horizontal direction. (The aperture on the left side as seen from the side of the CCD 9 shall be referred to the "left pupil 3*a*" below, and the aperture on the right side shall be referred to as the "right pupil 3*b*" below.) When focus is sensed, the focus sensing diaphragm 3 is inserted into the optical path of the taking lens by the motor 4, and the light shield 5 is moved by the motor 6 to shield the left pupil 3*a* or right pupil 3*b* from light so that an optical image comprising a bundle of rays that has passed through different pupil areas can be formed on the CCD 9.

Figure 2C:
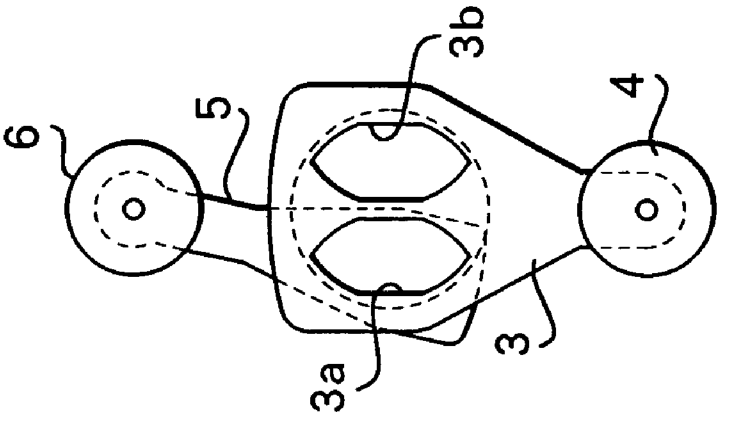
FIGS. 2A to 2C are diagrams showing the positional relationship between a focus sensing diaphragm and a light shield.
Figure 2B:
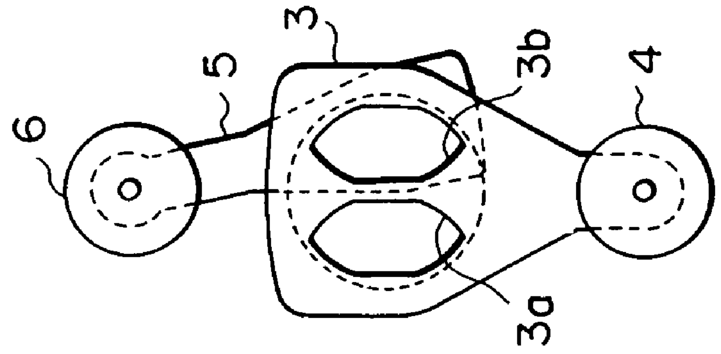
Figure 2A:
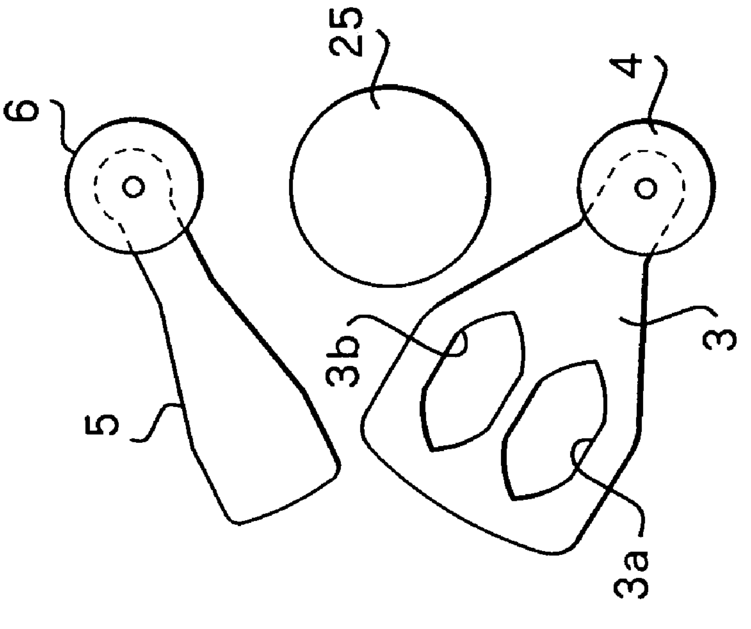

In order for pupil time-sharing phase-differential auto focusing to be carried out, the focus sensing diaphragm 3 is inserted into the optical path by instructions from the system controller 13. FIGS. 2A to 2C are diagrams showing the positional relationship between the focus sensing diaphragm 3 and light shield 5. In FIG. 2A, which shows the conditions that prevail at the time of photography, the focus sensing diaphragm 3 and light shield 5 are situated at positions outside of the optical path of the taking lens. Numeral 25 indicates the shape of the pupil obtained when the taking diaphragm of the taking lens has been opened.

First, as shown in FIG. 2B, the right pupil 3*b* of the focus sensing diaphragms 3 is blocked by the light shield 5 and the left pupil 3*a* of the taking lens is opened so that the optical image comprising the bundle of rays passing through the left pupil 3*a* is formed on the CCD 9, whereby the image is captured. The focus sensing image data comprising the bundle of rays that has passed through the left pupil 3*a* shall be referred to as "left image 1".

Next, in order to obtain focus sensing image data comprising a bundle of rays that has passed through a different pupil area, the motor 6 is actuated to move the light shield 5 in the manner shown in FIG. 2C, thereby opening the right pupil 3*b* of the taking optical system so that the optical image comprising the bundle of rays passing through the right pupil 3*b* is formed on the CCD 9, whereby the image is captured. The focus sensing image data comprising the bundle of rays that has passed through the right pupil 3*b* shall be referred to as "right image 2".

Further, in order to capture focus sensing image data that has passed through the left different pupil 3*a* and that is identical with that of the left image 1, the light shield 5 is again moved as shown in FIG. 2B and the image formed on the CCD 9 at this time is captured. The focus sensing image data comprising the bundle of rays that has passed through the left pupil 3*a* at this time shall be referred to as "left image 3".

A right image 4 and a left image 5 are then captured in similar fashion.

Exposure when capturing the focus sensing image data is carried out by providing an electronic shutter (not shown), a mechanical shutter (not shown), gain adjustment means (not shown) for the amplifier 10, summing read-out means (not shown) in the CCD 9 and, in certain cases, auxiliary light (not shown), and making adjustments using these means.

Though sensing of focus is performed by capturing the left image 1, right image 2, left image 3, right image 4 and left image 5 constituting the focus sensing image data, these items of image data are captured in a time series. In order to reduce focus sensing error owing to relative movement between the camera and subject (hand movement or movement of the subject, etc.), the intervals at which these images are captured should be made as short as possible. Accordingly, in regard to the reading out of the focus sensing image data, the read-out will take too much time if the entire screen of the CCD 9 is read out, as when reading out an image for photography. For this reason, only the part of the image necessary for sensing focus is read out at a speed higher than that of read-out in the case of ordinary photography.

Such a read-out method will now be described.

Figure 3:
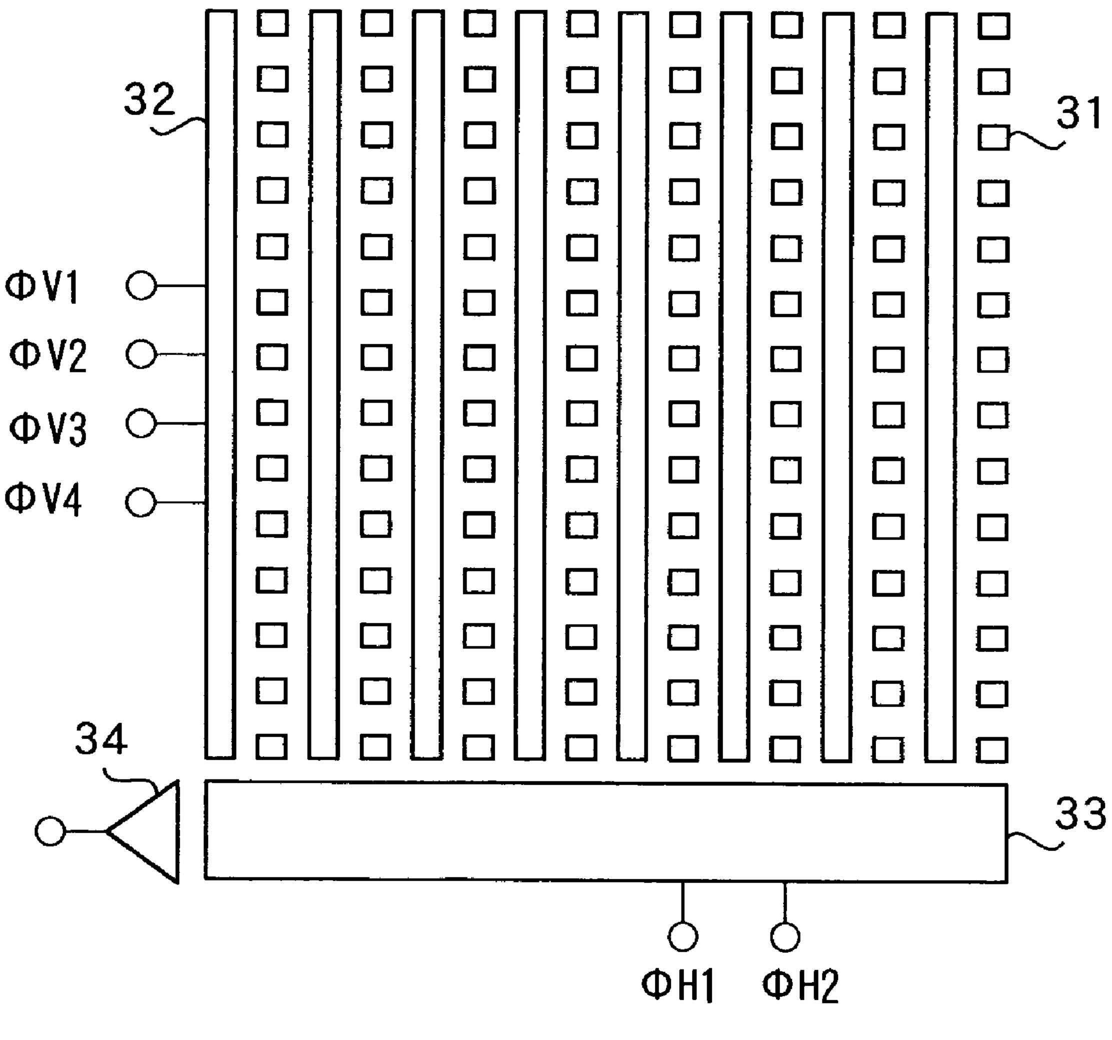
FIG. 3 is a diagram showing the construction of an interline CCD.

FIG. 3 is a schematic view illustrating an interline-type CCD. Shown in FIG. 3 are a pixel 31, a vertical charge transfer element 32, a horizontal charge transfer element 33 and as an output section 34. Signal charges obtained by photoelectric conversion at the pixels 31 are sent to the vertical charge transfer elements 32 and the charges are transferred in the direction of the horizontal charge transfer element 33 in order by four-phase driving pulses ϕV1, ϕV2, ϕV3 and ϕV4. The horizontal charge transfer element 33 transfers the signal charge of one horizontal row, which has been transferred from the vertical charge transfer elements 32, to the output section 34 by two-phase driving pulses ϕH1, ϕH2, whereby the charge is converted to voltage and output.

Figure 4:
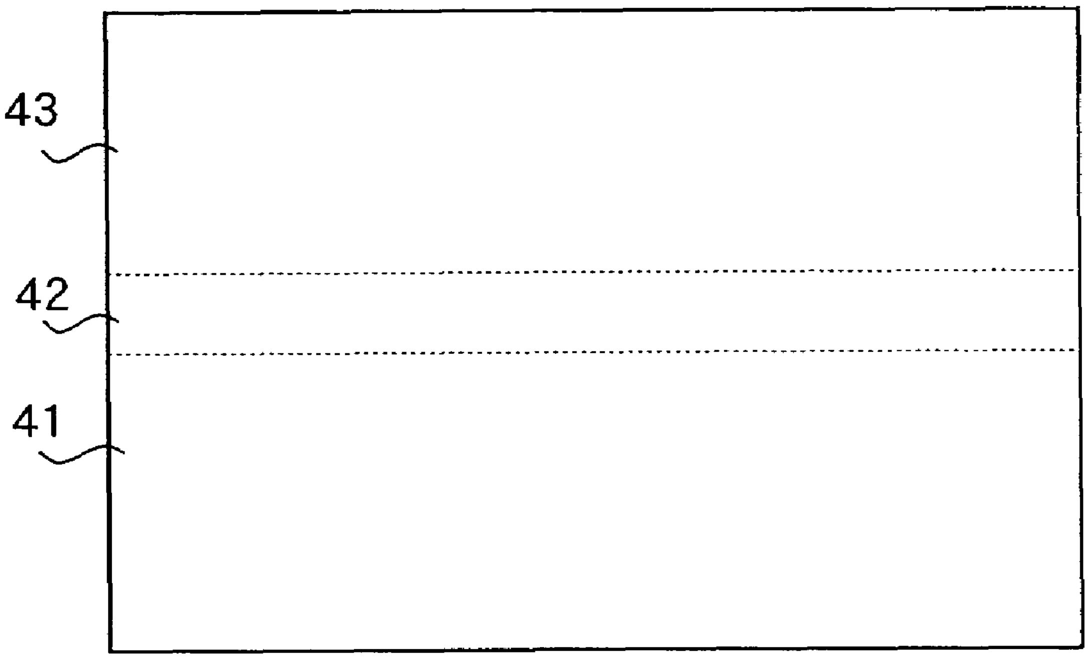
FIG. 4 is a diagram showing image sensing areas of a CCD.

FIG. 4 is a schematic view of image sensing areas of the CCD. In order to obtain a high-speed read-out operation, the present embodiment is such that only a readout area necessary for sensing focus is read out at ordinary speed. The charge in other areas is swept out and transferred at high speed. In FIG. 4, numeral 41 denotes an area read out at ordinary speed for sensing focus, and numerals 42, 43 denote first and second halves, respectively, of high-speed sweep-out transfer areas.

Figure 5:
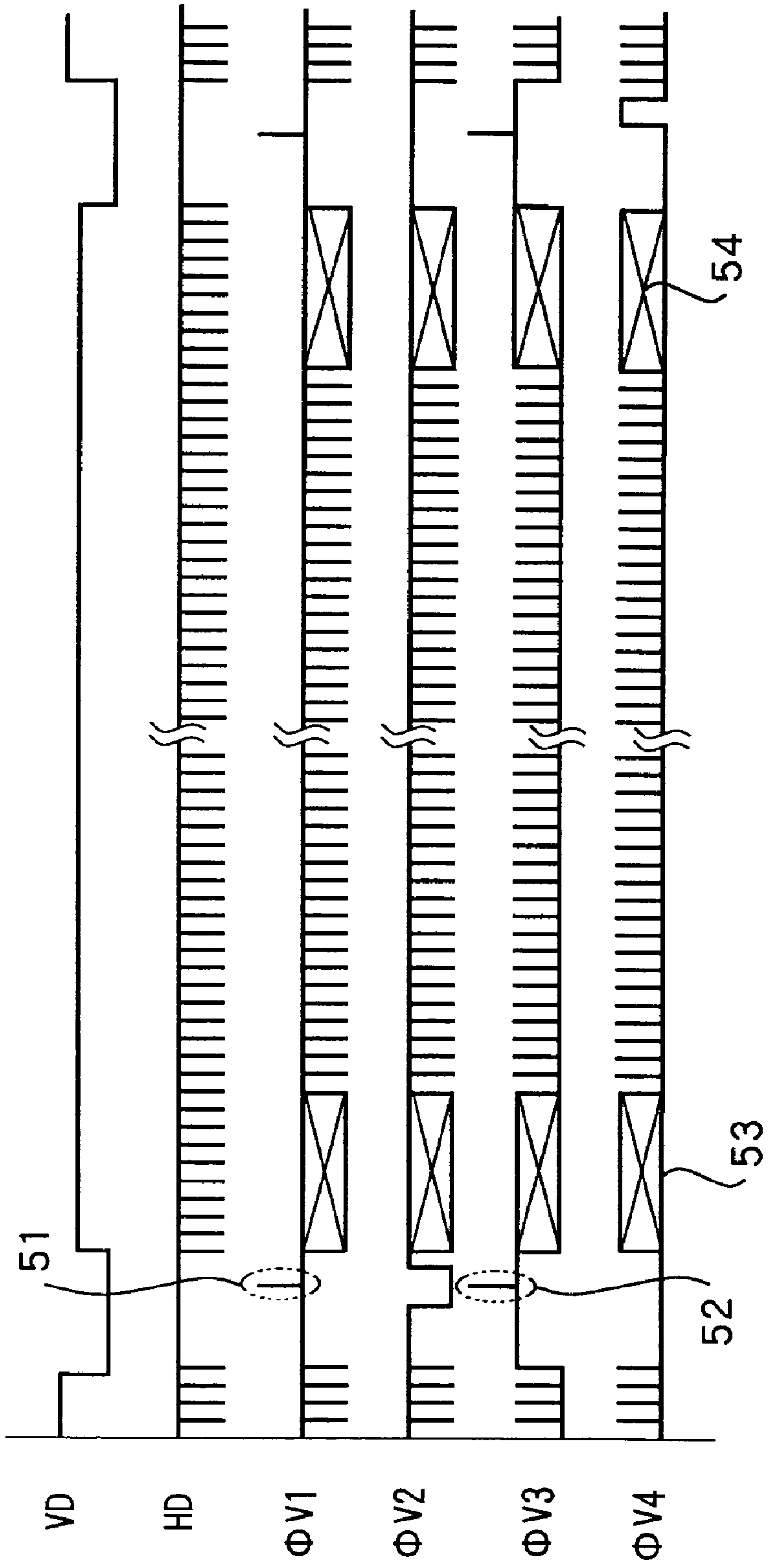
FIG. 5 is a timing chart of a vertical synchronizing interval in a case where the vertical charge transfer elements of the CCD are driven using four phases.

FIG. 5 is a timing chart of a vertical synchronizing interval in a case where the vertical charge transfer elements 32 of the CCD are driven using four phases. Here VD represents a vertical synchronizing signal, the vertical blanking interval of which is indicated by the low potential, and HD represents a horizontal synchronizing signal, the horizontal blanking interval of which is indicated by low potential. Further, ϕV1, ϕV2, ϕV3 and ϕV4 represent four-phase driving pulses of the focus sensing diaphragm 32, and numerals 51, 52 denote read-out pulses for transferring signal charges obtained by photoelectric conversion at the pixels 31 to the horizontal charge transfer element 33. Numerals 53, 54 denote high-speed sweep-out transfer pulses contained in the four-phase driving pulses. The transfer pulses 53, 54 are for high-speed transfer of the signal charges read out to the vertical charge transfer elements 32 from the areas 42 and 43 in FIG. 4. By thus sweeping out at high speed areas other than those requiring readout, it is possible to speed-up the partial read-out operation.

When a signal for sensing focus is read out, it is possible to add the signal charges of a plurality of lines using the horizontal charge transfer element 33 and read out the sum of the plurality of lines. This is to compensate for an inadequate quantity of light caused at the time of focus detection because the pupils 3*a*, 3*b* of the focus sensing diaphragm 3 are smaller than when the taking diaphragm is opened at the time of photography; it is used to raise the gain of amplifier 10 and to improve sensitivity.

A correlation operation between images is performed using the left image 1, right image 2, left image 3, right image 4 and left image 5 constituting the focus sensing image data thus obtained by high-speed read-out, and the phase differences between the images is obtained. The focus is sensed as a result. However, unlike a monochromatic sensor exclusively for sensing focus as used in a single-lens reflex silver-halide camera, a color filter is incorporated in a single color sensor, which serves as the taking image sensing element, in a case where the taking image sensing element is also used as the focus sensor. In order to use the output signal of the CCD as a phase-difference detecting signal, therefore, signal processing must be applied.

As mentioned above, the luminance signal produced using the luminance signal processing circuit for photography can be employed as the phase-difference detecting signal. However, when the time needed for focus detection is taken into consideration, it is preferred that the time required for processing to produce the phase-difference detecting signal from the output signal of the image sensing element be short. Thus, using the luminance signal processing circuit for photography as the signal for detecting phase difference involves difficulty.

Processing for obtaining the phase-difference detecting signal for sensing focus from the output signal of the CCD will now be described.

FIG. 6A is a diagram showing a color filter array incorporated in the CCD. If the four colors Ye, Cy, My, G (yellow, cyan, magenta, green) constituting the color filters are added one pixel at a time, we have Ye+Cy+Mg+G=2B+3G+2R. Accordingly, the average of the sum of the outputs of one block of 2×2 neighboring pixels is used as the signal for detecting phase difference.

In actuality, it is possible to perform line summing and read-out when the charge from the CCD 9 is read out, as mentioned above. By summing and reading out two lines, therefore, two pixels are added in the vertical direction in the CCD (FIG. 6B), this analog signal is converted to a digital signal by the A/D converter 11, and two pixels are added in the horizontal direction in the digital signal processor 12 (FIG. 6C), whereby there is obtained a phase-difference detecting signal which is the average of the sum of the outputs of one block of 2×2 pixels.

Figures 7A, 7B, 7C:
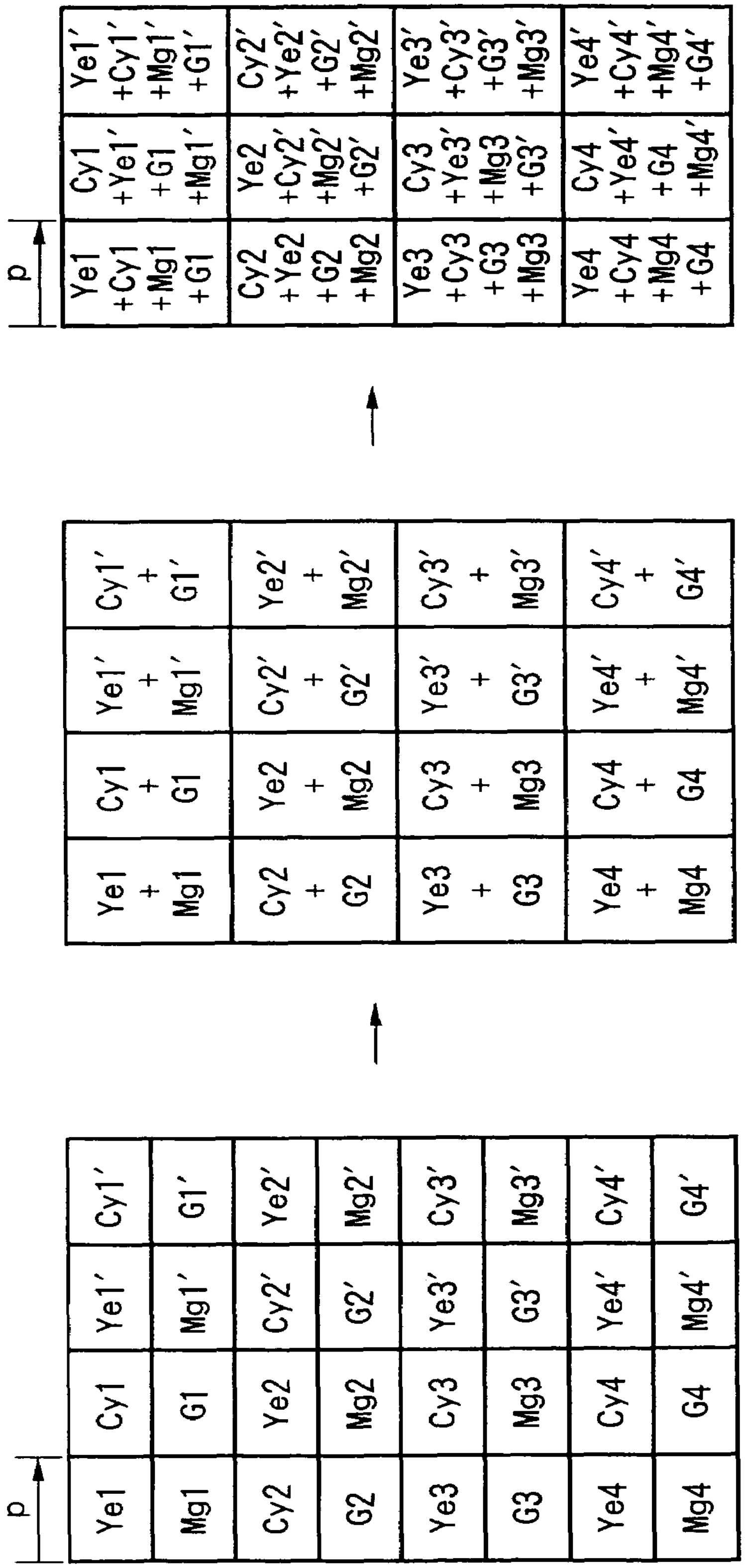
FIGS. 7A to 7C are diagrams useful in describing processing when a phase-difference detecting signal is obtained (here the pitch of phase-difference signals is one pixel of the CCD)

In FIGS. 6A to 6C, the pitch of the phase-difference signals is 2 p, where p is the pixel pitch of the CCD. However, digital processing may be performed so as to make the pitch of the phase-difference detecting signals p, as shown in FIGS. 7A to 7C.

In order to improve the S/N ratio in this embodiment, vertical summing is performed within the CCD. However, read-out may be performed without adding lines and vertical summing may be executed by digital signal processing.

Described next will be processing in which, when the subject is dark and the sensitivity necessary for detecting phase difference cannot be obtained, the number of summed lines at the time of read-out from the CCD 9 is made four lines instead of two lines to obtain the phase-difference detecting signal.

FIG. 8A is a diagram showing a color filter array incorporated in the CCD. If the four colors Ye, Cy, My, G constituting the color filters are added two pixels at a time, we have 2×(Ye+Cy+Mg+G)=2×(2B+3G+2R). Accordingly, the average of the sum of the outputs of one block of 4×2 neighboring pixels is used as the signal for detecting phase difference. This enlarges the pixel aperture for obtaining one phase-difference detecting signal and makes it possible to raise sensitivity as a result.

In actuality, the number of summed lines at the time of read-out from the CCD 9 is changed from two lines to four lines, as mentioned above, whereby four pixels are added in the vertical direction in the CCD (FIG. 8B), this analog signal is converted to a digital signal by the A/D converter 11, and two pixels are added in the horizontal direction in the digital signal processor 12 (FIG. 8C), whereby there is obtained a phase-difference detecting signal which is the average of the sum of the outputs of one block of 4×2 pixels.

Figure 9A:
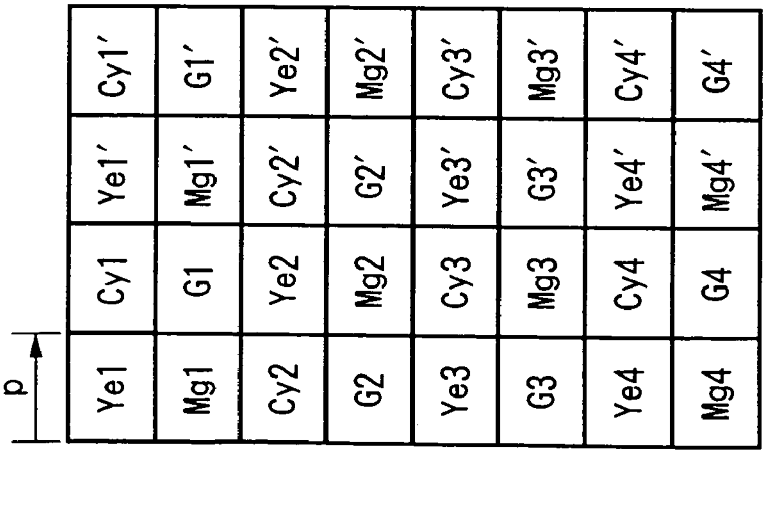
FIGS. 9A to 9C are diagrams useful in describing processing when a phase-difference detecting signal is obtained in a case where the subject is dark and sensitivity necessary for detecting phase difference cannot be obtained (here the pitch of phase-difference signals is one pixel of the CCD)
Figure 9B:
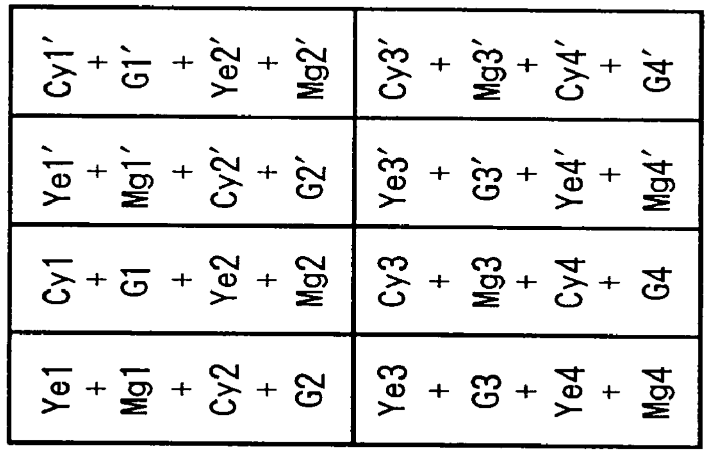
Figure 9C:
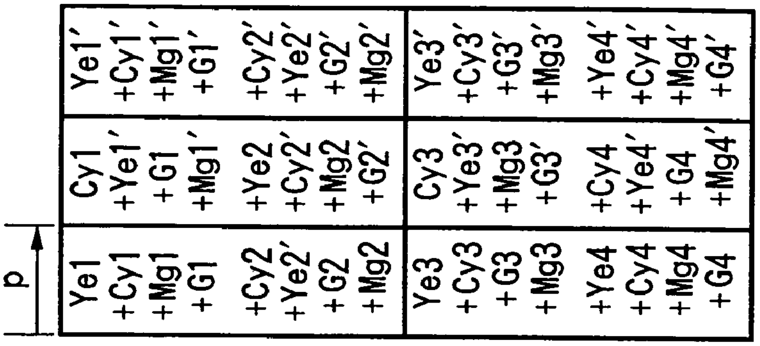

In FIG. 8C, the pitch of the phase-difference signals is 2 p, where p is the pixel pitch of the CCD. However, digital processing may be performed so as to make the pitch of the phase-difference detecting signals p, as shown in FIG. 9C.

In order to improve the S/N ratio in this embodiment, vertical summing is performed within the CCD. However, read-out may be performed without adding lines and vertical summing may be executed by digital signal processing.

Described next will be processing in which, when the subject is dark and focus is detected upon introducing auxiliary light for focus detection, the phase-difference detecting signal is obtained from the output signal of the CCD.

There are cases where the spectrum of the auxiliary light for focus detection has a spectrum on the side of long wavelengths. In such case, rather than using all of the colors Ye, Cy, Mg, G constituting the color filters on the CCD 9, it is better to select output signals of the color filters for which the transmittance of the spectrum on the long wavelength side is high and eliminate output signals of the color filters for which the above-mentioned transmittance is low, thereby improving focus detection precision. Accordingly, processing for obtaining the phase-difference detecting signal is changed, weighting used when summing output signals from the pixels of each color is changed to give precedence to the long wavelength side, and calculation is performed using the filter output signals of M and Ye.

FIG. 10A is a diagram showing a color filter array incorporated in the CCD. In one block of 2×2 neighboring pixels of the four colors Ye, Cy, Mg, G constituting the color filters, adding the colors upon making 0 the weighting of Cy, G and 1 the weighting of Mg, Ye gives us (1×Ye+0×Cy+1×Mg+0×G). Accordingly, the average of the sum of the outputs of one pixel each of My, Ye for which the transmittance of the spectrum on the long wavelength side is high is used as the phase-difference detecting signal.

In actuality, rather than performing line summing and read-out (FIG. 10B) when charge is read out of the CCD, this analog signal is converted to a digital signal by the A/D converter 11, the weighting of Cy, G is made 0 and the weighting of My, Ye is made 1 within the digital signal processor 12, Mg, Ye are extracted and processing is executed (FIG. 10C), thereby obtaining a phase-difference detecting signal which is the average of the sum of the outputs of Mg, Ye in one block of 2×2 pixels.

Next, using the phase-difference detecting signal obtained in the manner described above, a correlation operation is performed to find the phase difference.

Figure 11A:
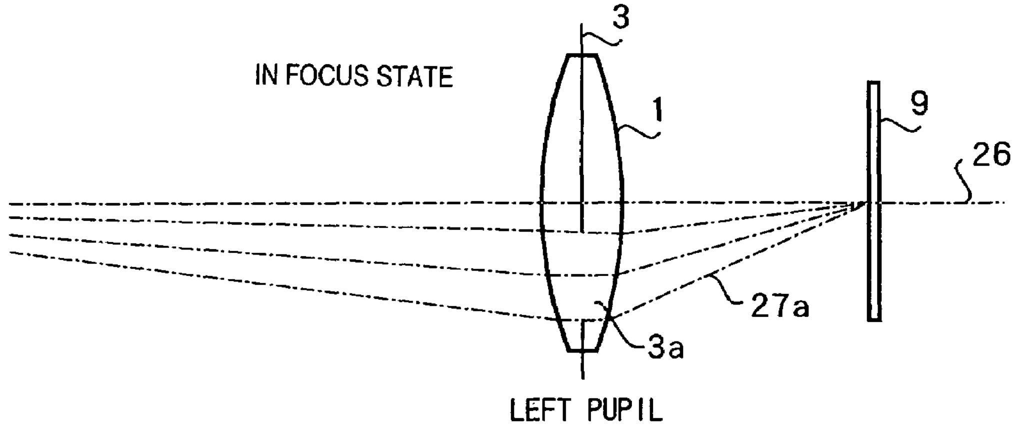
FIGS. 11A to 11C are diagrams useful in describing a focus sensing principle.
Figure 11B:
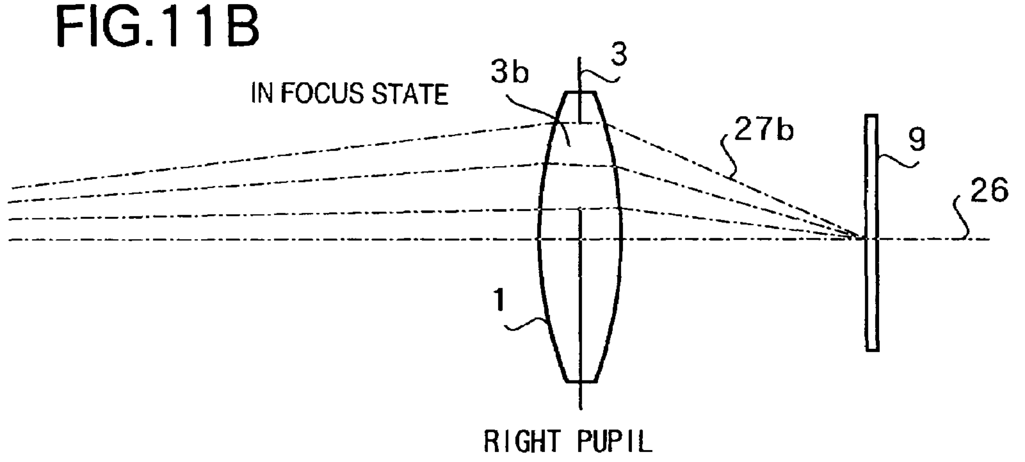
Figure 11C:
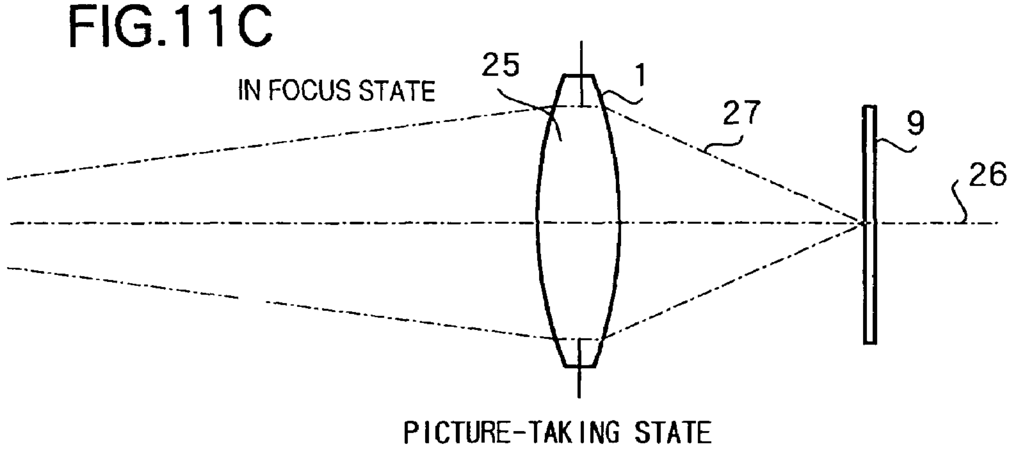

FIGS. 11A to 11C, 12A to 12C and 13A to 13C are diagrams useful in describing the focus sensing principle of pupil time-sharing phase-differential AF according to this embodiment. FIGS. 11A to 11C illustrate the in-focus state. In the picture-taking state shown in FIG. 1C, a ray bundle 27 that has passed through a taking lens 1 has its focal point formed on the light-receiving surface of the CCD 9 and the amount of defocusing is zero.

In FIG. 11A, the focus sensing diaphragm 3 is inserted into the optical path of the taking lens, the right pupil 3*b* is shielded from light by the light shield 5, the left pupil 3*a* is opened and a ray bundle 27*a* that has passed through the left pupil 3*a* forms an image on the light-receiving surface of the CCD 9 at a position having a distance of zero from the optical axis 26. In FIG. 11B, the left pupil 3*a* is shielded from light by the light shield 5, the right pupil 3*b* is opened and a ray bundle 27*b* that has passed through the right pupil 3*b* forms an image on the light-receiving surface of the CCD 9 at a position having a distance of zero from the optical axis 26. Thus, in the in-focus state, optical images comprising ray bundles that have passed through the different pupils 3*a*, 3*b* both impinge upon the light-receiving surface of the CCD 9 at the same position having zero distance from the optical axis 26. Accordingly, the phase difference between these two images is zero.

Figure 12A:
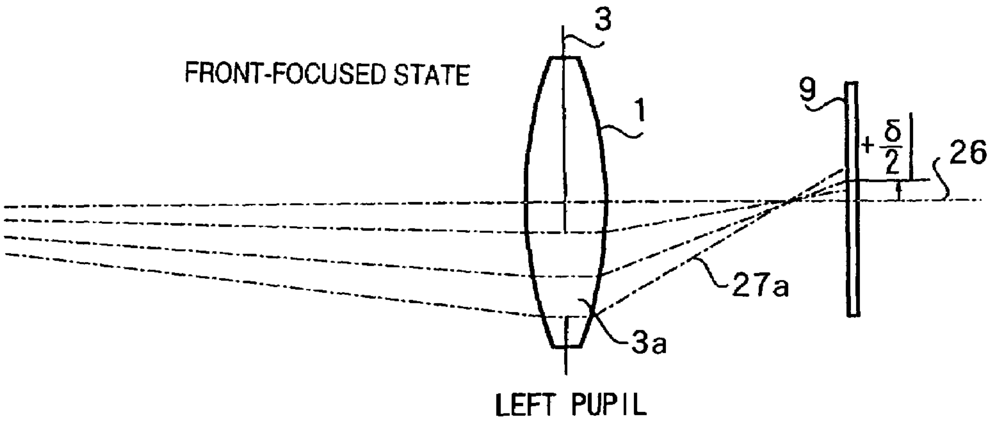
FIGS. 12A to 12C are diagrams useful in describing a focus sensing principle.
Figure 12B:
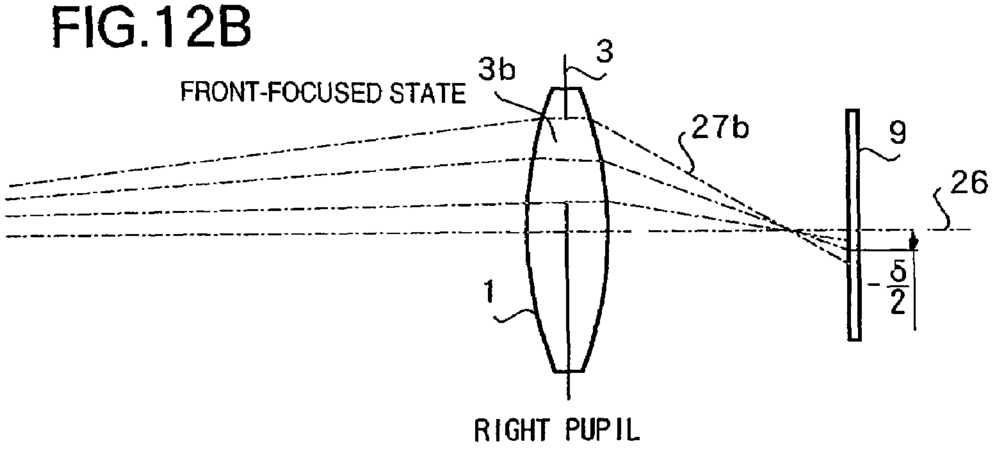
Figure 12C:
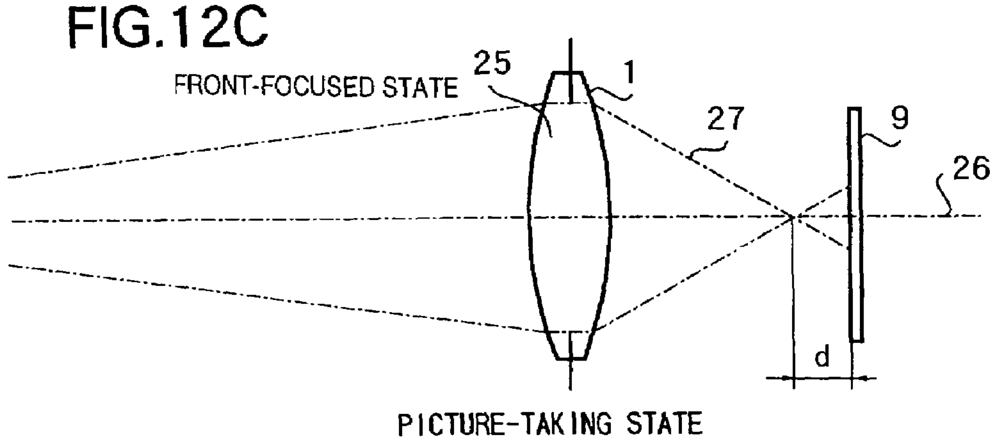

FIGS. 12A to 12C illustrate the front-focused state. In the picture-taking state shown in FIG. 12C, the ray bundle 27 that has passed through a taking lens 1 has its focal point formed a distance d in front of the light-receiving surface of the CCD 9. In FIG. 12A, the focus sensing diaphragm 3 is inserted into the optical path of the taking lens, the left pupil 3*a* is opened and the ray bundle 27*a* that has passed through the left pupil 3*a* forms an image on the light-receiving surface of the CCD 9 at a position having a distance of +δ/2 from the optical axis 26. In FIG. 12B, the right pupil 3*b* is opened and the ray bundle 27*b* that has passed through the right pupil 3*b* forms an image on the light-receiving surface of the CCD 9 at a position having a distance of −δ/2 from the optical axis 26. Thus, in the front-focused state, the phase difference between the two images comprising the ray bundles that have passed through the two difference pupils 3*a*, 3*b* is (+δ/2)−(−δ/2)=δ.

Figure 13A:
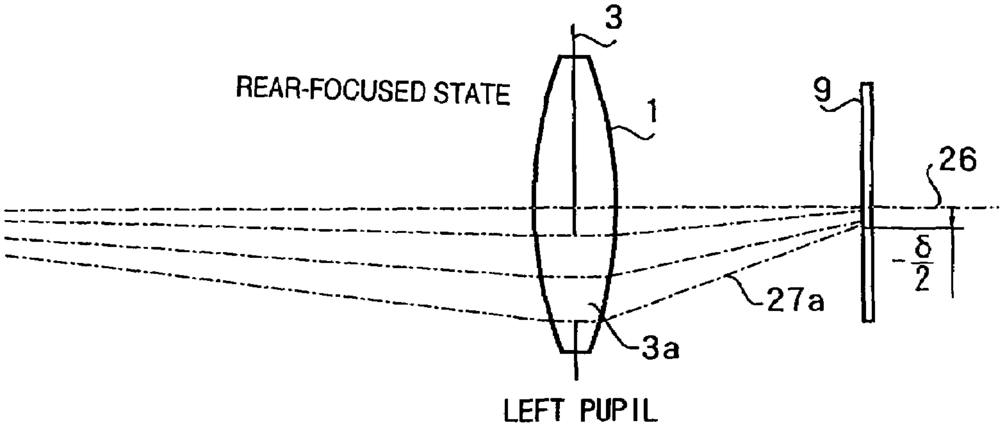
FIGS. 13A to 13C are diagrams useful in describing a focus sensing principle.
Figure 13B:
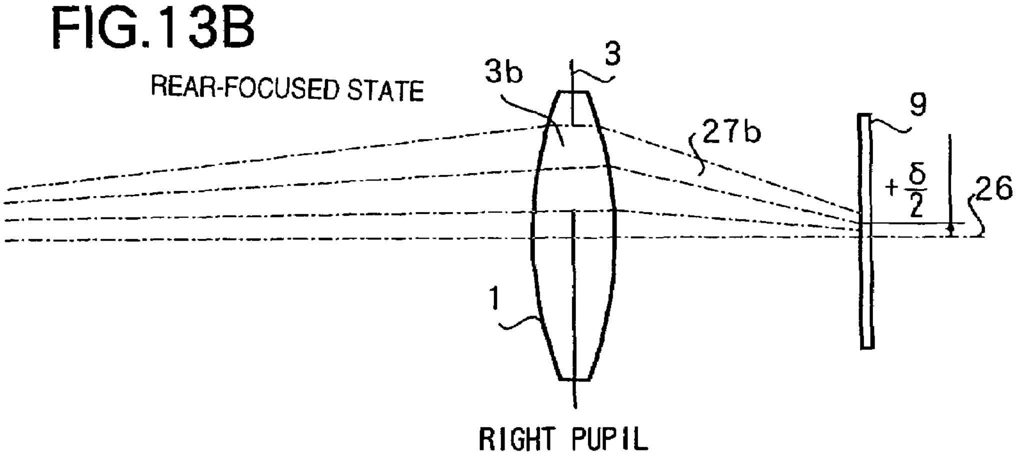
Figure 13C:
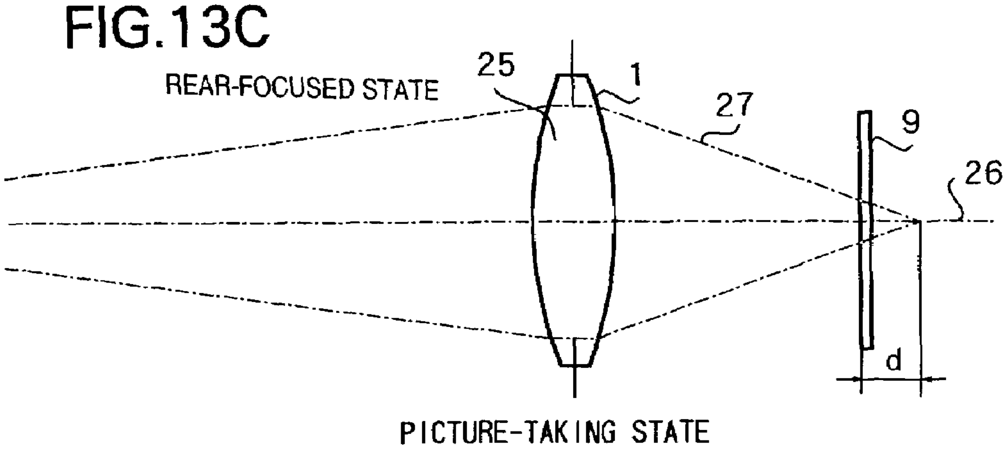

FIGS. 13A to 13C illustrate the rear-focused state. In the picture-taking state shown in FIG. 13C, the ray bundle 27 that has passed through a taking lens 1 has its focal point formed a distance d to the rear of the light-receiving surface of the CCD 9. In FIG. 13A, the focus sensing diaphragm 3 is inserted into the optical path of the taking lens, the left pupil 3*a* is opened and the ray bundle 27*a* that has passed through the left pupil 3*a* forms an image on the light-receiving surface of the CCD 9 at a position having a distance of −δ/2 from the optical axis 26. In FIG. 13B, the right pupil 3*b* is opened and the ray bundle 27*b* that has passed through the right pupil 3*b* forms an image on the light-receiving surface of the CCD 9 at a position having a distance of +δ/2 from the optical axis 26. Thus, in the rear-focused state, the phase difference between the two images comprising the ray bundles that have passed through the two difference pupils 3*a*, 3*b* is (−δ/2)−(+δ/2)=−δ.

Thus, the in-focus state can be sensed by obtaining the phase difference between two phase-difference detecting signals comprising the ray bundles that have passed through the left pupil 3*a* and right pupil 3*b*.

The phase-difference calculation algorithm will now be described.

First, in order to simplify the discussion, a case in which the relative positions of the subject and taking optical system are not moved will be described as an example.

Figure 14:
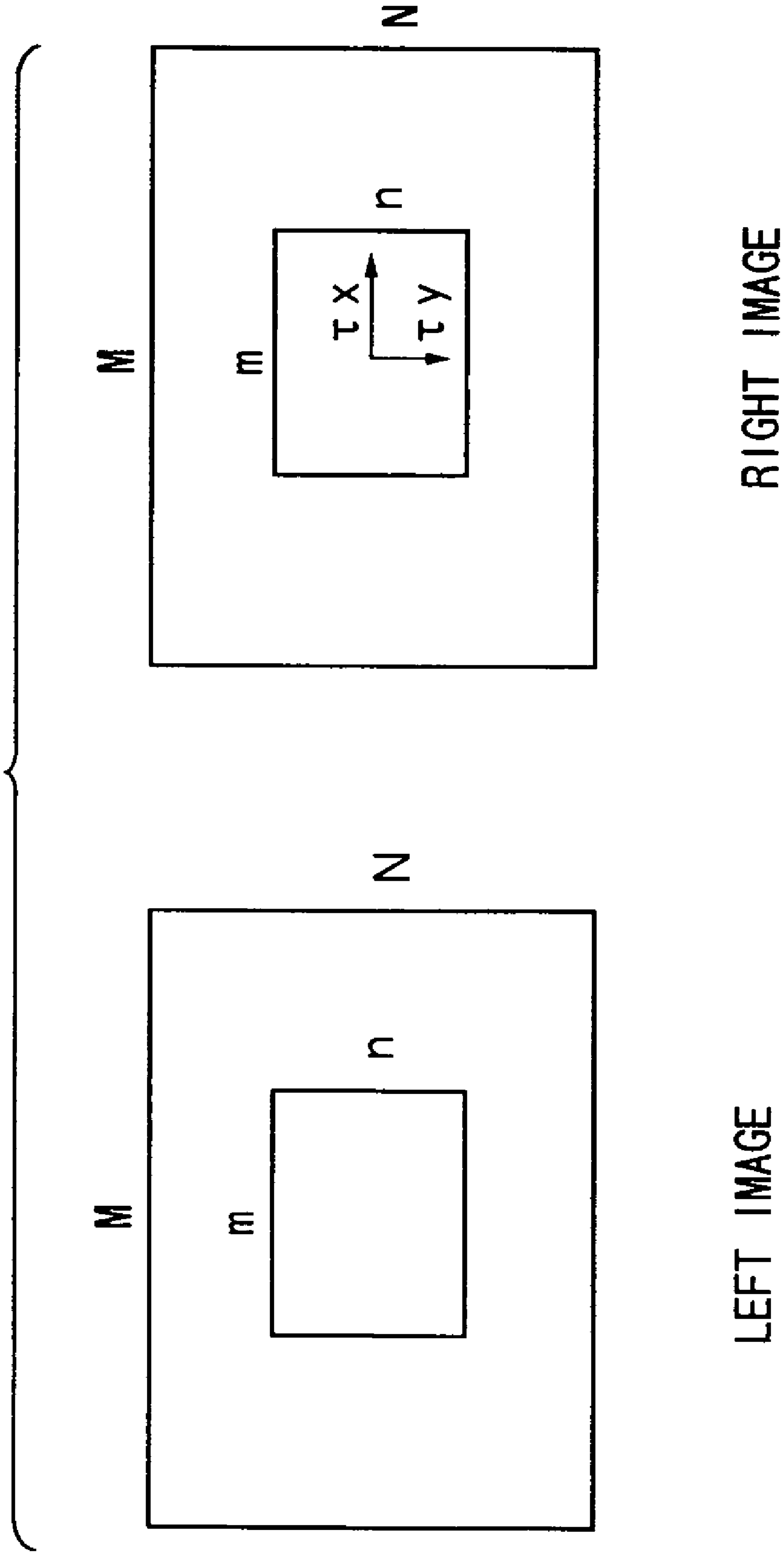
FIG. 14 is a diagram useful in describing how to perform a correlation when a phase difference is obtained by a correlation calculation.

The phase difference between the phase-difference detecting signal (left image) comprising the ray bundle that has passed through the left pupil area and the phase-difference detecting signal (right image) comprising the ray bundle that has passed through the right pupil area is obtained by a correlation operation. As shown in FIG. 14, the phase-difference detecting signals each comprise M×N signals horizontally and vertically, respectively, from which m×n signals are cut to perform a correlation operation.

The correlation is performed as follows: As indicated by Equation (1), the integrated value C(τx, τy) (where τx, τy are positive variables) of the product of a and b is calculated while holding the cutting position of data a of the left image and successively shifting the phase (τx, τy) of data b of the right image with respect to the left image, and the value C (τx, τy) obtained every phase (τx, τy) is adopted as the amount of correlation between the two images.

$$C(\tau x, \tau y)=\sum_{j=1}^{n}\sum_{i=1}^{m}[a(i, j)\times b(i+\tau x, j+\tau y)] \tag{1}$$

where x=−Tx, . . . −2, −1, 0, 1, 2, . . . , Tx y=−Ty, . . . −2, −1, 0, 1, 2, . . . , Ty The correlation quantity C(τx, τy) takes on a minimum value and the phase (τx, τy) at such time corresponds to the phase difference (δx, δy) between the data a of the left image and the data b of the right image. Furthermore, in order to obtain the phase (τx, τy), which raises the phase-difference detection precision, up to a value below the decimal point and not the value of a whole number (the case where the phase-difference detecting signal was found so as to make the pitch the same as that of the CCD pixel pitch, as in FIG. 7), the phase difference should be calculated by interpolation using the minimum value of the correlation quantity and values on either side thereof.

In a case where relative positions of the subject and taking optical system move, δy becomes zero in principle if the effects of noise and the like are nil.

In order to reduce the effects of the pattern and contrast of the subject, the effects of a difference in photographic conditions, the effects of the color filter array incorporated in the solid-state image sensing element and the effects of noise, the correlation operation may be performed after the phase-difference detecting signal is subjected to filter processing.

Since the relationship between phase difference and the amount of movement of the image plane and amount of defocusing is decided by the optical system, focusing is achieved by finding the amount of defocusing from the phase difference, finding the amount of lens feed necessary to attain the in-focus state and then controlling the focusing of the optical system accordingly.

Described above is a method of sensing focus using two images comprises ray bundles that have passed through different pupil areas in a case where there is no relative movement between the subject and optical system.

Next, an algorithm for calculating phase difference will be described in a case where there is relative movement between the subject and optical system. Though the phase difference can be obtained from two images (left and right images) comprising bundles of light from difference pupil areas, in this embodiment the left and right images are captured in a time series and, if there is relative movement between the subject and the optical system (hand movement or movement of the subject) and the phase difference will include a focus sensing error owing to the effects of such movement.

Accordingly, in regard to the reading out of the focus sensing image data, it has been contemplated not to read out the entire screen of the CCD, as when reading out an image for photography, but to read out only the part of the image necessary for sensing focus at a speed higher than that of read-out in the case of ordinary photography, as described earlier. This makes it possible to shorten the image capture interval as much as possible. However, capturing the signals of the left and right images involves an operation that differs with time; if the camera and subject move relative to each other during this operation, the occurrence of an error in the detection of phase difference cannot be avoided.

In this embodiment, therefore, five images, namely the left image 1, right image 2, left image 3, right image 4 and left image 5, are captured as the phase-difference detecting signals in a time series, and a correction of the phase-difference error due to relative movement between the camera and subject (hand movement and movement of the subject) is performed using the plurality of phase differences obtained from neighboring images.

If the camera and subject move relative to each other, the influence thereof appears in the phase difference ($\delta x$, $\delta y$) between the two images. Here $\delta y$ is the phase difference of the images in the vertical direction and has a direction orthogonal to the direction of a phase shift produced in dependence upon the amount of optical defocusing. It therefore does not include a phase-shift component due to defocusing but only phase-shift component due to relative movement between the camera and subject. Accordingly, the value of $\delta y$ is used as is as a quantity for correcting image movement in the vertical direction caused by relative movement between the camera and subject.

The phase difference of the images in the horizontal direction is represented by $\delta x$. This corresponds to the direction of the phase shift produced in dependence upon the amount of optical defocusing. Consequently, the value $\delta x$ obtained from two images that include relative movement between the camera and subject includes a phase-shift component due to defocusing and a phase-shift component due to relative movement between the camera and subject.

Figure 15:
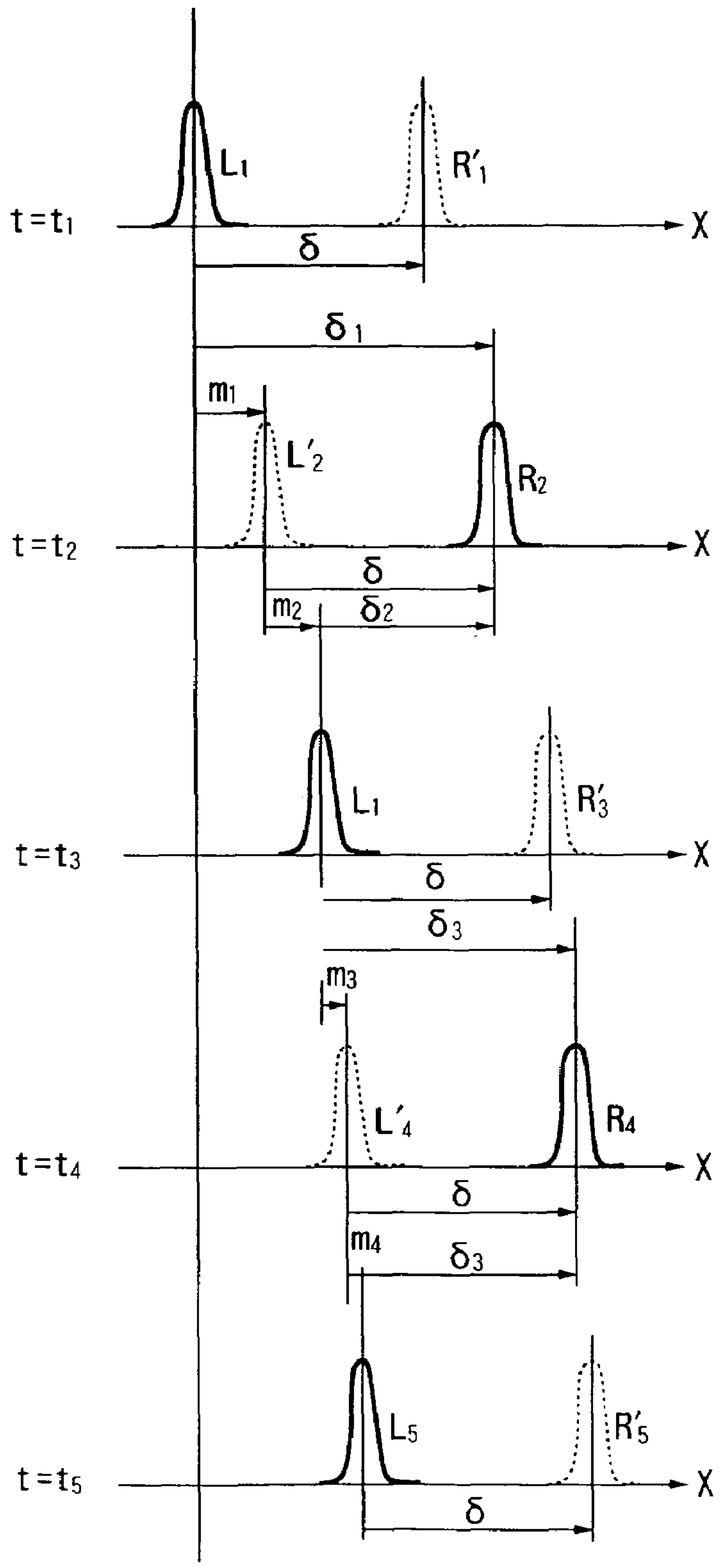
FIG. 15 is a waveform diagram showing the relationship between the lateral position of images and a phase difference between images due to relative movement between a camera and a subject.

FIG. 15 illustrates the relationship between position of an image in the horizontal direction (x direction) due to relative movement between the camera and subject and phase difference between the images after image movement due to relative movement between the camera and subject in the vertical direction has been corrected. The solid lines L1, R2, L3, R4, L5 are the positions of the left image 1, right image 2, left image 3, right image 4 and left image 5, respectively, captured by switching between pupils in a time series in order to detect the phase difference. Further, t=t1, t2, t3, t4, t5 denote the capture times of the respective images; the intervals at which the images are captured are equal. The broken lines R1', L2', R3', L4', R5' indicate the positions of images comprising ray bundles that have passed through different pupils on the assumption that capture is performed at the same time. In actuality, these are signals for which capture is not possible.

Further, m1, m2, m3, m4 denote amounts of image movement due to relative movement between the camera and subject during the time of image capture of each image, and $\delta$ represents the phase-shift component due to defocusing of the optical system; it is the phase difference sought for sensing the focus.

First, phase differences $\delta 1$, $\delta 2$, $\delta 3$, $\delta 4$ between the images L1 and R2, R2 and L3, L3 and R4, R4 and L5, respectively, comprising ray bundles from different pupils are obtained using the left image as a reference. As will be understood from FIG. 15, each phase difference obtained includes a phase-shift component due to defocusing and a phase-shift component due to relative movement between the camera and subject.

Figure 16:
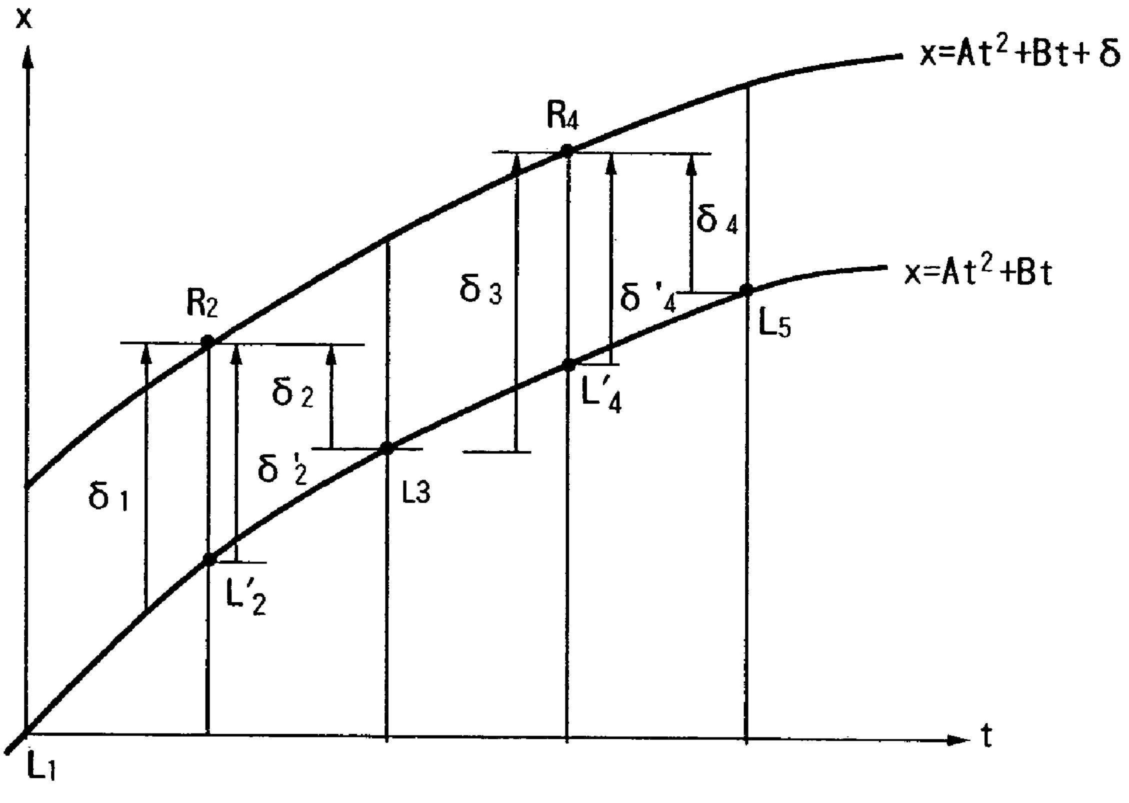
FIG. 16 is a characteristic diagram for describing a method of correcting phase-differential detection error.

FIG. 16 is a diagram for describing a method of correcting phase-difference detection error. Here time t is plotted along the horizontal axis and position x of the image is plotted along the vertical axis. Further, L1, R2, L3, R4, L5 represent positions of the subject image captured in a time series. By applying a quadratic-function approximation to movement of the subject image due to relative movement between the camera and subject during signal capture, the positions L2', L4' of the subject of the left image at times t2, t4, respectively, are obtained. The average value of the phase difference $\delta 2'$ between L2 and R2 and the phase difference $\delta 4'$ between L4 and R4' is finally obtained and is adopted as the phase difference $\delta$.

If the quadratic function $y=At^2+Bt$ passing through (t1, x1), (t3, x3), (t5, x5) is obtained as t1=0, x1=0 and the finally obtained phase difference $\delta$ found from the average value of $\delta 2'$ and $\delta 4'$, the capture intervals of the images will be equal. The phase difference $\delta$ after correction, therefore, is as indicated by Equation (2) below.

$$\delta=(\delta 1+3\times\delta 2+3\times\delta 3+\delta 4)/8 \quad (2)$$

The amount of lens feed necessary to achieve the in-focus state is obtained from the thus found phase difference $\delta$ corrected for relative movement between the camera and subject, the optical system is subjected to focusing control accordingly, and photography is carried out after the in-focus state is attained.

In performing photography, the picture is taken after the focus sensing diaphragm 3 is withdrawn from the optical path of the taking lens. In order to record the image, the data is read out of the CCD, subjected to image signal processing by the digital signal processor 12 and, if necessary, subjected to processing such as image data compression. The resulting image is recorded on a recording medium via the card slot 13.

The image data at this time is subjected to video processing by the digital signal processor 12 in order to be displayed in the viewfinder. The processed data is displayed in viewfinder 18 via the VRAM 21. The photographer can thus check the image of the subject.

In this embodiment, a phase-difference detecting signal is obtained from one block which includes one pixel of each of the colors constituting the color filter array of an image sensing element. As a result, it is possible to execute processing more simply in comparison with complicated matrix processing such as luminance signal processing for photography. It is possible to speed up processing of the phase-difference detecting signal and reduce the scale of circuitry.

Further, the average of the sum of one block which includes one pixel of each of the colors constituting the color filter array of an image sensing element is adopted as the phase-difference detecting signal. This makes simpler processing possible.

Further, by obtaining a phase-difference detecting signal from one block composed of mutually adjacent pixels which include one pixel of each color constituting the color filter array of the image sensing element, simpler processing becomes possible.

Further, when the phase-difference detecting signal is obtained, weighting used when summing the pixels of each color is changed in dependence upon the color temperature of the light source, i.e., the subject. As a result, rather than using output signals of all colors constituting the color filters upon weighting these signals identically and then averaging them, output signals of color filters for which the transmittance is high with respect to various conditions such as the color temperature of the subject due to auxiliary light are selected over output signals of color filters for which the transmittance is low, thereby improving focus sensing precision.

Further, by providing means for moving the pupil area, the image sensing element for photography can also be used as a sensor for sensing focus, thus making it possible to conserve space, reduce cost and raise focus sensing accuracy.

Downsampling Processing

When a correlation operation for obtaining phase difference is performed, the data of all phase-difference detecting signals within an area (m×n areas in FIG. 14) employed in the correlation operation is used as is, as mentioned earlier. The signal pitch of the phase-difference detecting signals at this time is the same as the pixel pitch of the CCD, also as mentioned above. However, in a case where the taking lens is a zoom lens, the focal length on the telephoto end differs from that on the wide-angle end. When these focal lengths are compared for the same subject distance, it is found that the focal length on the wide-angle end has a greater depth of field and that it is acceptable for the focus sensing precision necessary for sensing focus to be lower on the wide-angle end than on the telephoto end.

Figure 17A:
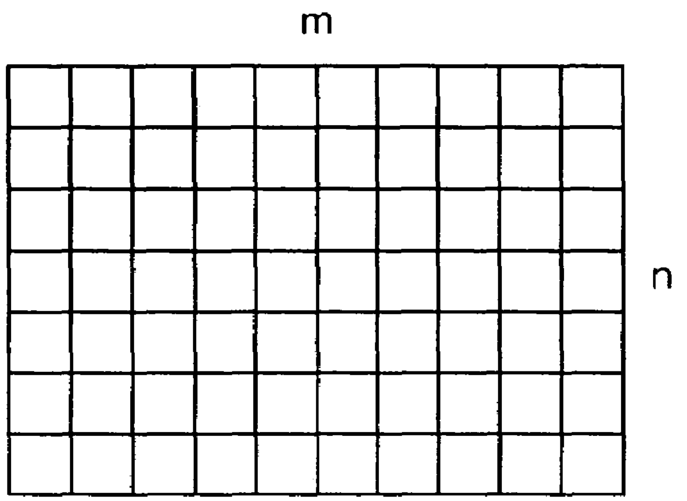
FIGS. 17A and 17B are diagrams useful in describing downsampling of data used in correlation calculation.
Figure 17B:
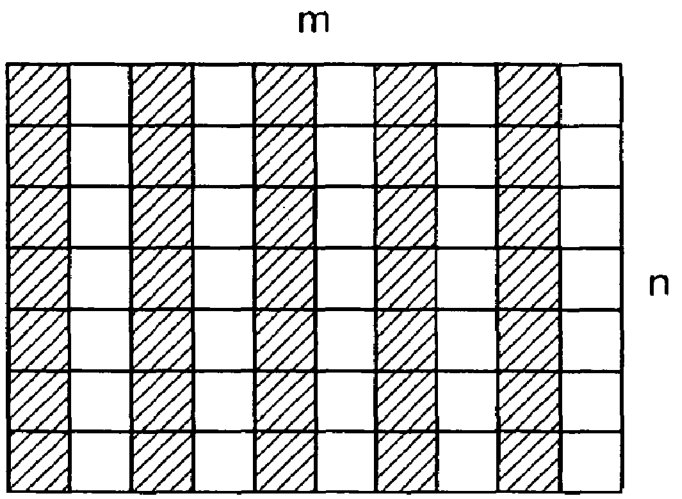
Figure 19:
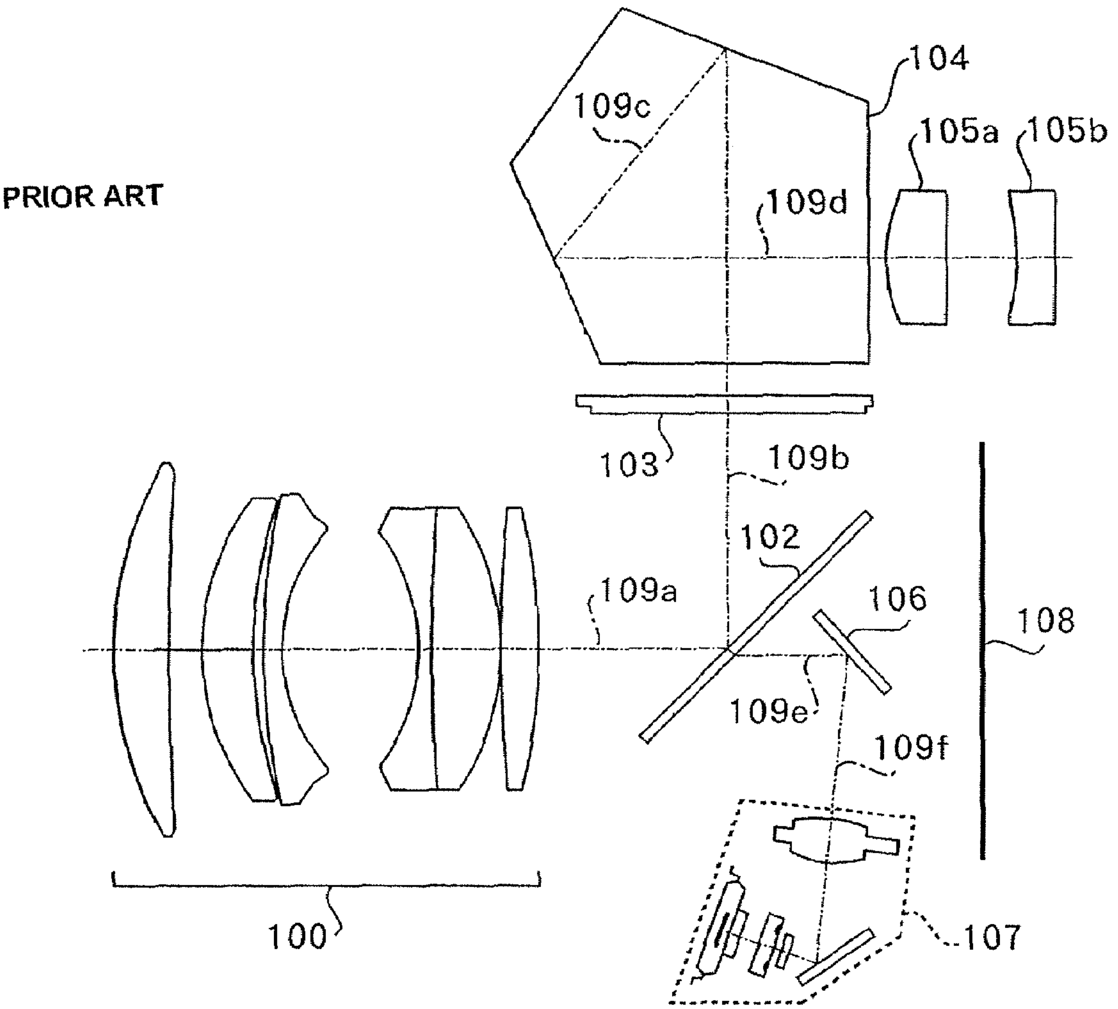
FIG. 19 is a diagram showing the construction of a single-lens reflex camera having a focus sensing apparatus using a phase-differential detection method according to the prior art.
Figure 20A:
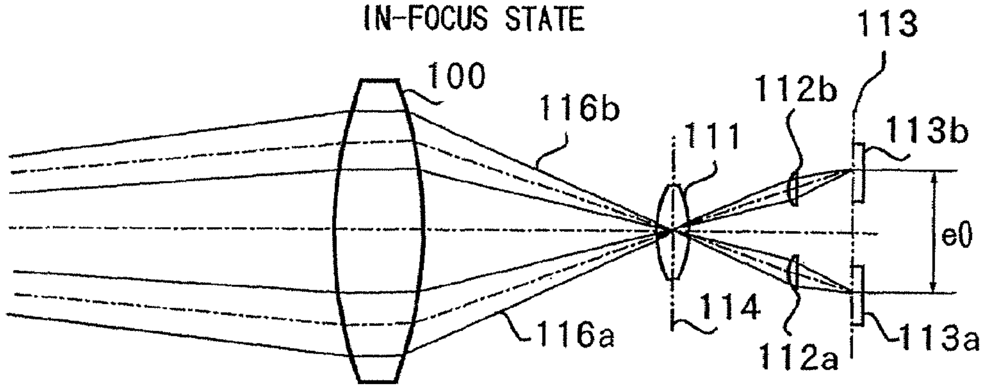
FIGS. 20A to 20C are diagrams for describing a focus sensing principle according to the prior art.
Figure 20B:
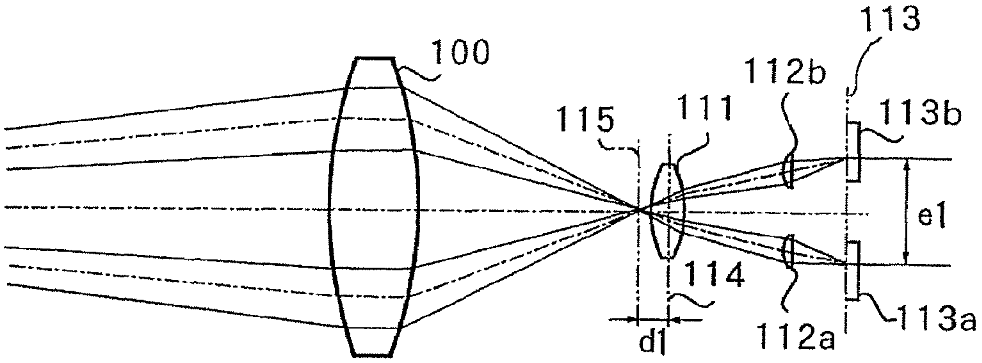
Figure 20C:
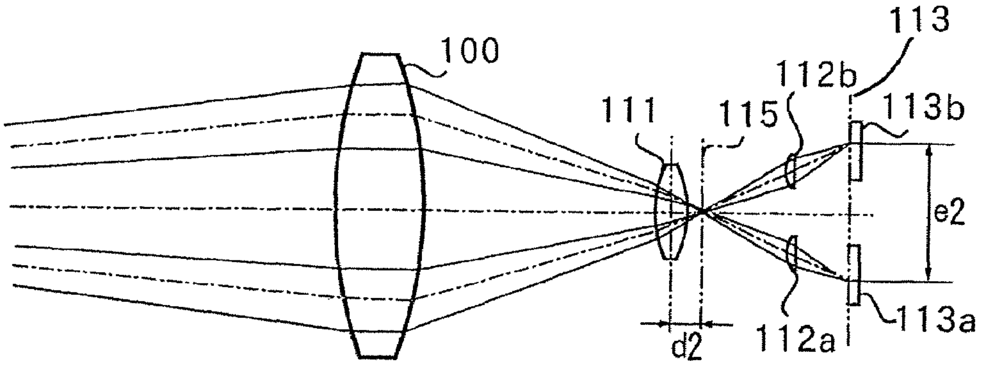
Figures 21A, 21B, 21C:
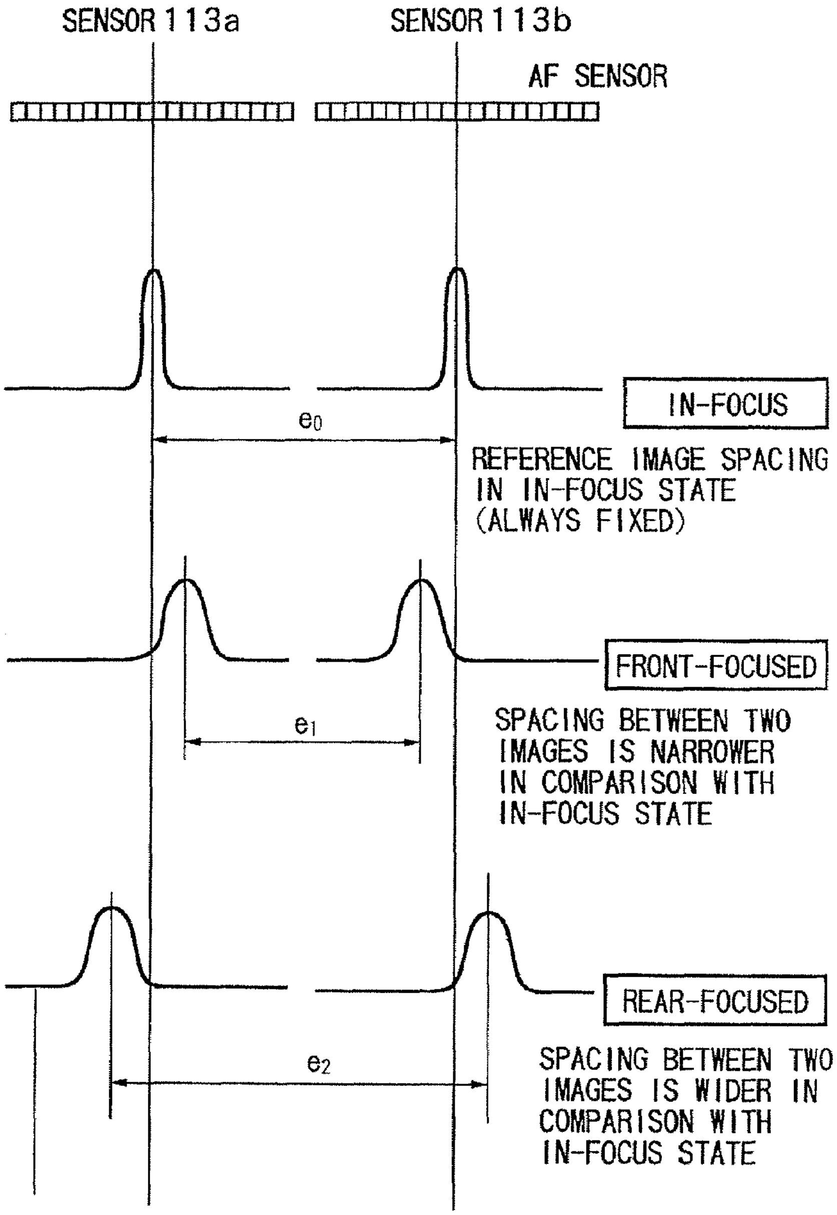
FIGS. 21A to 21C are diagrams for describing the focus sensing principle according to the prior art.

A first example of downsampling processing according to this embodiment is as follows: When the focus sensing precision on the wide-angle end is one-half the focus sensing precision on the telephoto end, it will suffice to find the phase difference with one-half the precision. If photography is performed on the wide-angle end, therefore, then, in regard to data in the horizontal direction corresponding to the direction of the phase shift produced in dependence upon the amount of defocusing of the optical system, the data of the m×n areas used in the correlation operation is downsampled every other pixel, as shown in FIG. 17A, the signal pitch of the phase-difference detecting signals used in the correlation operation is made one-half the pixel pitch of the CCD and then the correlation operation is carried out. The shaded portions shown in FIG. 17B represent the data used in the correlation operation.

As a result of the foregoing, the number of items of data used in correlation becomes m/2×n, thereby shortening the time needed for the correlation operation. Thus, it will suffice to select, in dependence upon the focal length at which photography is actually performed, whether or not the downsampling of data used in the correlation operation is carried out.

This embodiment is described in regard to a zoom lens. However, in case of a camera in which taking lenses can be interchanged, the focus sensing precision can be changed by changing whether or not downsampling is performed in dependence upon the focal length of the lens actual used in photography. Though the amount of downsampling is 50% in this embodiment, the amount of downsampling may be changed in dependence upon the focal length of the taking lens.

In regard to data in the vertical direction of the phase-difference detecting signal, downsampling may be carried in the vertical direction in a case where it is permissible for the correction precision of the image in the vertical direction due to relative movement between the camera and subject to be low.

The amount of lens feed necessary to achieve the in-focus state is obtained from the thus found phase difference δ corrected for relative movement between the camera and subject, the optical system is subjected to focusing control accordingly, and photography is carried out after the in-focus state is attained. In performing photography, the picture is taken after the focus sensing diaphragm 3 is withdrawn from the optical path of the taking lens. In order to record the image, the data is read out of the CCD 9, subjected to image signal processing by the digital signal processor 12 and, if necessary, subjected to processing such as image data compression. The resulting image is recorded on a recording medium via the card slot 13.

The image data at this time is subjected to video processing by the digital signal processor 12 in order to be displayed in the viewfinder. The processed data is displayed in viewfinder 18 via the VRAM 21. The photographer can thus check the image of the subject.

A second example of downsampling processing according to this embodiment will now be described.

The second example of downsampling processing involves selecting, in dependence upon the F-number of the taking lens, whether or not to perform downsampling of the data of the phase-difference detecting signal used in the correlation operation for obtaining the phase difference.

Only the differences between this processing as that of the first example of downsampling will be described.

When the aperture of the taking lens is stopped down, depth of field increases. It will be understood, therefore, the focus sensing precision necessary for sensing focus differs depending upon the F-number of the taking lens when a picture is taken. In general, the allowed amount of defocusing is F×R, where F represents the F-number of the taking lens and R the radius of the least circle of confusion. The larger the F-number F (the more the aperture is stopped down), the greater the allowable amount of defocusing, the lower the focus sensing precision needed and, hence, the lower the phase-difference detection precision needed.

Accordingly, when the phase difference is obtained, the method of downsampling the data of the phase-difference detecting signals in the area used in the correlation operation is changed in dependence upon the F-number at the time of photography, thereby shortening the time needed for the correlation operation.

For example, if a picture is taken in a case where the open aperture F-number of the taking lens is F2, the data employed in the correlation operation uses the phase-difference detecting signals that prevailed prior to downsampling, as shown in FIG. 17A. Since the signal pitch of the phase-difference detecting signals is the same as the pixel pitch of the CCD, the pitch of the data used in the correlation operation is equal to the pixel pitch of the CCD and the number of items of data is m×n.

Next, if a picture is taken in a case where the F-number of the taking lens is F4, the operation is performed after the data used in the correlation operation is downsampled every other pixel, a shown in FIG. 17B. The shaded portions represent the downsampled data used in the correlation operation. The pitch of the data used in the correlation operation at this time is twice the CCD pixel pitch and the number of items of data is m/2×n. In other words, the data is reduced by one-half.

By thus downsampling the data used in the correlation operation in dependence upon the F-number at the time of photography, processing time can be shortened.

A third example of downsampling processing according to this embodiment will now be described.

The third example of downsampling processing involves selecting, on the basis of whether photography is performed with the optical low-pass filter 7 inserted or not at the time of photography, whether or not to perform interpolation of the data of the phase-difference detecting signals used in the correlation operation for obtaining the phase difference.

Only the differences between this processing as that of the first example of downsampling will be described.

The CCD 9 in FIG. 1 is capable of being moved in a plane orthogonal to the optical axis by a pixel shifting mechanism (not shown). Color filters of the kind shown in FIG. 18 are incorporated in the CCD 9. Assume that the CCD is composed of square pixels having a pixel pitch p. The pixel shifting mechanism is capable of moving the CCD in the horizontal and vertical directions of the image by a piezoelectric element. As shown in FIG. 18, an image 1 is captured and then shifted in the horizontal direction by p/2, an image 2 is captured and then shifted in the vertical direction by p/2, an image 3 is captured and then shifted in the horizontal direction (the direction opposite that of the shift made in order to capture the image 2) by p/2, and an image 4 is captured.

From these four images it is possible to obtain image data that corresponds to raw image data captured at a sampling interval of p/2 (where the pixel aperture is equal to the CCD that performed photography). As a result, a composite image having a resolution higher than that of one image captured by the CCD can be obtained.

The optical low-pass filter 7 has a spatial frequency characteristic in which the response becomes zero at the Nyquist frequency, which is one-half the sampling frequency with respect to the pixel pitch p of the CCD 9. The filter 7 functions to suppress aliasing components due to the spatial sampling of the CCD. However, in a case where a composite image is obtained by capturing a plurality of images by shifting pixels, as described above, photography is performed through an optical low-pass filter in which the response becomes zero at the Nyquist frequency with respect to the pixel pitch p of the CCD. Consequently, the composite image obtained by combining the plurality of images is not rendered as a picture having a very high resolution.

Accordingly, when pixel-shifting photography is performed, the picture is taken after withdrawing the optical low-pass filter from the optical path of the taking lens. In other words, the resolving of the image formed on the CCD in the ordinary photography mode in which there is no pixel shift differs from that in the photography mode in which pixels are shifted, and this is accompanied by different focus sensing precisions as well.

Thus, in the case of the ordinary photography mode in which a picture is taken with the optical low-pass filter inserted into the optical path of the taking lens, a low focus sensing precision will suffice. As shown in FIG. 17B, therefore, calculation is performed after the data used in the correlation calculation is downsampled every other pixel. The shaded portions represent the downsampled data used in the correlation operation. The pitch of the data used in the correlation operation at this time is twice the CCD pixel pitch and the number of items of data is m/2×n. In other words, the data is reduced by one-half.

In the case of the pixel shifting photography mode in which a picture is taken with the optical low-pass filter withdrawn from the optical path of the taking lens, it is necessary to raise the focus sensing precision. As shown in FIG. 17A, therefore, the data used in the correlation operation employs the phase-difference detecting signals prevailing prior to downsampling. The pitch of the data used in the correlation operation at this time is equal to the pixel pitch of the CCD and the number of items of data is m×n. Thus, when a picture is taken with the optical low-pass filter inserted, the data used in the correlation operation is downsampled, thereby making it possible to shorten processing time.

Thus, in accordance with the downsampling processing of this embodiment as described above, downsampling means for downsampling the data of the phase-difference detecting signals in an area used in the correlation operation is provided when performing a correlation operation for obtaining the phase difference in order to sense focus and when performing a correlation operation to obtain the data of phase-difference detecting signals in an area used in the correlation operation. As a result, whether or not data used in the correlation operation is to be downsampled can be selected in dependence upon such photographic conditions as focal length of the taking lens, F-number at the time of photography and the degree to which the image can be resolved on the image sensing medium. This makes it possible to detect the phase difference with a focal-length sensing precision suited to the photographic conditions, to shorten the time necessary for the correlation operation and to shorten the time needed for overall sensing of focus.

Correlation Method

In the case of a camera system in which the amount of defocusing falls within the prescribed allowable limits by a single focus detection operation and control of the focus of the optical system, photography may begin without performing a second detection of focus for confirmation purposes. Since the in-focus state usually is confirmed, however, ordinarily focus is sensed from the second time onward. In such case the correlation operation is performed to again obtain the phase difference. However, performing the same correlation operation the second time in a case where the amount of defocusing is smaller after the first time represents needless calculation.

Accordingly, in a first example of a correlation method according to this embodiment, the range of a search of image signals at the time of phase-difference detection is narrowed, from the second focus detecting operation onward, based upon the amount of defocusing serving as the preceding focus detection information, and the correlation operation is carried out following the narrowing of the search range. In actuality, the value of Tx, which is the search range of $\tau x$ of the correlation calculation equation (1), need only be reduced so as to become a value obtained by the time of the phase difference δ1 detected the first time. When large defocusing is performed in this manner, the search range is broadened and then narrowed when a point near the in-focus state is achieved. This makes it possible to shorten the time needed for the correlation calculations from the second time onward.

Here an example has been described in which the (i+1) th search range is narrowed to become a value that is found by the time of the phase difference δ1 detected the first time. However, since the phase difference when the (i+1)th focus detection operation is performed becomes smaller than the phase difference the first time, it will suffice to change to a search range obtained by the time of a prescribed phase difference δ1' (<δ1), with respect to the first phase difference δ1.

Thus, after the in-focus state is achieved, the focal-point sensing diaphragm 3 is withdrawn from the optical path of the taking lens and the picture is taken. In order to record the image, the data is read out of the CCD, subjected to image signal processing by the digital signal processor 12 and, if necessary, subjected to processing such as image data compression. The resulting image is recorded on a recording medium via the card slot 13.

This image data is subjected to video processing by the digital signal processor 12 in order to be displayed in the viewfinder. The processed data is displayed in viewfinder 18 via the VRAM 21. The photographer can thus check the image of the subject.

A second correlation method according to this embodiment will now be described.

According to the second correlation method, the number of steps the image signal in the correlation operation for obtaining the phase difference is shifted at the succeeding focus sensing operation is made different from that of the preceding focus sensing operation.

Only the differences between this method and the first example of the correlation method will be described.

When a state of large defocusing prevails in a case where it is necessary to perform focus detection and focusing control of the optical system two or more times to attain the in-focus state, first focus is sensed in the state of large defocusing and focus is finally sensed in a state near the in-focus state. Accordingly, it will suffice to initially perform coarse sensing of focus, move the lens to the vicinity of focus and then perform precise focusing.

Accordingly, in the first focus sensing operation, the τx shifting method is made τx=−Tx, −Tx+2 . . . , −4, −2, 0, 2, 4, . . . , Tx−2, Tx in the correlation calculation equation (1) for obtaining the phase difference, and the step quantity for shifting the image signal is doubled. When the preceding phase difference δ becomes smaller than a predetermined value, the number of steps for shifting the image signal is decremented and the correlation operation is performed. In other words, the focus sensing precision is changed in such a manner that at first the focus sensing precision is lowered, coarse focusing is performed and then, when a point near the in-focus state is attained, sensing is performed at a higher precision. Thus, the amount of calculation is reduced to the extent that the step quantity is coarsened, thereby shortening the time needed for the correlation operation. A similar operation may be carried out in regard to τy as well.

A third correlation method according to this embodiment will now be described.

According to the third correlation method, the size of the area of the phase-difference detecting signals used in the correlation operation at the succeeding focus sensing operation is made different from that of the preceding focus sensing operation.

The size of the area of the phase-difference detecting signals used in the correlation operation usually is fixed at a predetermined size. However, in a case where the contrast of the subject is low and phase difference cannot be detected, or in a case where the detection precision is poor, enlarging the area causes the edge of the subject to fall within the area, thereby raising the detection precision. However, if the area is too large, a subject having a long subject distance and a subject having a short subject distance tend to occur in the area and detection precision declines (perspective conflict). The area usually is set to a predetermined size for this reason.

Accordingly, the result of focus detection up to the preceding time is checked. If focus detection cannot be carried out or if the focus state cannot be attained even if detection is performed a prescribed number of times, the size of the area is enlarged by a predetermined value. This prevents wasteful repeated sensing of focus in a state in which the edge of the subject is not within the area and makes it possible to reduce the number of times focus is sensed. The result is shorter calculation time.

The enlarging of the area may be performed not only in the horizontal direction but in the vertical direction as well.

A fourth correlation method according to this embodiment will now be described.

According to the fourth correlation method, whether or not a shift operation in a direction substantially orthogonal to the direction of the phase shift produced in dependence upon the defocusing quantity of the optical system is selected in the correlation operation.

Only the differences between this method and the first example of the correlation method will be described.

When optical images comprising bundles of rays from different pupil areas are captured, the time at which the left image is captured differs from that at which the right image is captured. For this reason, a case in which there is relative movement between the subject and optical system is dealt with in the manner described above. However, in a case where there is a large amount of hand movement, the phase differences δ1, δ2, δ3, δ4, δ5 develop a variance and the precision with which the phase difference δ is detected declines if a shift calculation is performed by the correlation operation in the vertical direction, which is substantially orthogonal to the direction of the phase shift produced in dependence upon the amount of defocusing of the optical system.

In a case where the S/N ratio of the phase-difference detecting signal is poor, e.g., in a case where the subject is dark, the amount of light is inadequate and the output of the CCD 9 is enlarged by the amplifier 10, the phase differences δ1, δ2, δ3, δ4, δ5 develop a variance and the precision with which the phase difference δ is detected declines if a shift calculation is performed by the correlation operation in the vertical direction, which is substantially orthogonal to the direction of the phase shift produced in dependence upon the amount of defocusing of the optical system.

When the correlation operation is performed under such photographic conditions, therefore, a shift calculation in the vertical direction, which is substantially orthogonal to the direction of the phase shift produced in dependence upon the amount of defocusing of the optical system, is not performed.

In actuality, the fact that the S/N ratio is poor is judged from the exposure decision value that is for adjusting the amount of light, and the shift calculation in the vertical direction is not carried out when such a judgment is made. Further, when the variance in the vertical phase differences δy1, δy2, δy3, δy4, δy5 between the images L1 and R2, R2 and L3, L3 and R4, R4 and L5, respectively, comprising bundles of light from different pupils exceeds a predetermined value, it is judged that hand movement is large and the vertical shift operation is not carried out.

Thus, when the precision with which the phase difference δ is detected will decline if a shift calculation is performed in the vertical direction, which is substantially orthogonal to the direction of the phase shift produced in dependence upon the amount of defocusing of the optical system, the correlation operation in this direction is not carried out. This makes it possible to prevent a decline in detection precision and shorten calculation time.

A fifth correlation method according to this embodiment will now be described.

The fifth correlation method is such that in the correlation operation for obtaining the phase difference, downsampling means is provided for performing the correlation upon downsampling the data of the phase-difference detecting signals in the area used in the correlation operation, and whether or not downsampling is to be performed is selected based upon the result of the preceding focus sensing operation.

Only the differences between this method and the first example of the correlation method will be described.

When a correlation operation for obtaining phase difference is performed, the data of all phase-difference detecting signals within an area (m×n areas in FIG. 14) employed in the correlation operation is used as is, as mentioned earlier. The signal pitch of the phase-difference detecting signals at this time is the same as the pixel pitch of the CCD, also as mentioned above.

However, when a state of large defocusing prevails in a case where it is necessary to perform focus detection and focusing control of the optical system two or more times to attain the in-focus state, first focus is sensed in the state of large defocusing and focus is finally sensed in a state near the in-focus state. In other words, it will suffice to move the lens coarsely to the vicinity of focus and then perform precise focusing.

Accordingly, in regard to data in the horizontal direction corresponding to the direction of the phase shift produced in dependence upon the amount of defocusing of the optical system, the first time the focus sensing operation is performed the data of the m×n areas used in the correlation operation is downsampled every other pixel, as shown in FIG. 17A, the signal pitch of the phase-difference detecting signals used in the correlation operation is made one-half the pixel pitch of the CCD and then the correlation operation is carried out. The shaded portions shown in FIG. 17B represent the data used in the correlation operation. When the phase difference δ that is the result of the preceding focus sensing operation becomes smaller than a predetermined value, the correlation operation is performed without executing downsampling.

More specifically, the focus sensing precision is changed in such a manner that at first the focus sensing precision is lowered, coarse focusing is performed and then, when a point near the in-focus state is attained, sensing is performed at a higher precision. As a result, the number of items of data used in correlation becomes m/2×n, thereby shortening the time needed for the correlation operation.

Though the amount of downsampling is 50% in this embodiment, the amount of downsampling may be changed depending upon the results of focusing. Further, downsampling may be performed in similar fashion in the vertical direction as well.

A sixth correlation method according to this embodiment will now be described.

This method differs from the fifth correlation method in that whether or not downsampling is performed is selected based upon the number of detection operations and not the results of focus detection up to the preceding time.

When a correlation operation for obtaining phase difference is performed, the data of all phase-difference detecting signals within an area (m×n areas in FIG. 14) employed in the correlation operation is used as is, as mentioned earlier in the description of the first correlation method. The signal pitch of the phase-difference detecting signals at this time is the same as the pixel pitch of the CCD, also as mentioned above.

However, when a state of large defocusing prevails in a case where it is necessary to perform focus detection and focusing control of the optical system two or more times to attain the in-focus state, first focus is sensed in the state of large defocusing and focus is finally sensed in a state near the in-focus state. In other words, it will suffice to move the lens coarsely to the vicinity of focus and then perform precise focusing.

Accordingly, in regard to data in the horizontal direction corresponding to the direction of the phase shift produced in dependence upon the amount of defocusing of the optical system, as shown in FIGS. 17A, 17B, the first time the focus sensing operation is performed the data of the m×n areas used in the correlation operation is downsampled every other pixel, as shown in FIG. 17A, the signal pitch of the phase-difference detecting signals used in the correlation operation is made one-half the pixel pitch of the CCD and then the correlation operation is carried out. The shaded portions shown in FIG. 17B represent the data used in the correlation operation. In focus sensing operations from the second onward, the correlation operation is performed without executing downsampling.

More specifically, when the first focus sensing operation is performed, at which time the amount of defocusing may be large, the focus sensing precision is lowered and then focus detection from the second time onward is performed with a high precision. By performing downsampling in this manner, the number of items of data used in correlation becomes m/2×n in the first focus sensing operation and less time is needed for the correlation operation.

In accordance with the correlation methods of this embodiment, as described above, a plurality of calculation methods for sensing focus are selected and the calculation is performed a plurality of times, thereby making it possible to select a calculation method suited to focus detection at the time. In comparison with a situation in which one calculation method is used in all cases, needless calculation can be eliminated. This makes it possible to speed up calculations.

Further, in accordance with this embodiment, the calculation method for the next detection of focus is selected based upon information representing the preceding detection of focus. As a result, a succeeding calculation method can be made different from a preceding calculation method based upon previous focus detection information, the number of times focus is detected and the detection conditions. This makes it possible to eliminate needless calculation the next time focus is detected and, hence, to shorten calculation time.

Further, in accordance with the present invention, the search range of image signals at the time of phase-difference detection the next time is made different from the last time in the correlation operation for obtaining the phase difference. When the amount of defocusing is large, the search range at the time of phase-difference detection can be enlarged; when the amount of defocusing is small, the search range at the time of phase-difference detection can be reduced. By setting the next search range based upon the amount of defocusing previously, needless calculation can be eliminated and calculation can be speeded up.

Further, in accordance with this embodiment, the number of steps the image signal at the time of phase-difference detection is shifted the next time is made different from the last time in the correlation operation for obtaining the phase difference. In a case where it is acceptable for the focus detection precision to be low, the number of steps is increased; in a case where a high precision is required for focus detection, the number of steps is reduced. This makes it possible to perform calculation suited to the required focus detection precision and to perform calculations more quickly.

Further, in accordance with this embodiment, the size of the area of a plurality of image signals used in the correlation operation the next time is made different from the last time in the correlation operation for obtaining the phase difference. As a result, it is possible to change the area of the subject used in sensing focus and the precision with which focus is sensed is raised. In addition, needless calculations can be eliminate and, hence, calculations can be performed at higher speed.

Further, in accordance with this embodiment, whether or not a shift operation in a direction substantially orthogonal to the direction of the phase shift produced in dependence upon the defocusing quantity of the optical system is selected in the correlation operation for obtaining the phase difference. As a result, by performing a shift operation in a direction orthogonal to the direction of the phase shift produced in dependence upon the defocusing quantity, it is possible to forego the shift operation in this direction in a case where focus detection precision declines. The focus detection precision is raised as a result. In addition, since needless calculation can be eliminated, calculation time can be shortened.

Further, in accordance with this embodiment, the correlation operation is performed upon downsampling the data of a plurality of image signals in an area used in the correlation operation. By selecting whether or not to perform downsampling based upon information representing the preceding detection of focus, the downsampling method used in the correlation operation the next time can be different from the last time in dependence upon the focus detection precision required. This makes it possible to eliminate needless calculation the next time focus is detected and, hence, to shorten calculation time.

Further, in accordance with this embodiment, owing to the fact that the information representing sensing of focus is the result of sensing focus, the state of defocusing can be determined from the preceding result of focus detection. As a result, the method of downsampling data used in the correlation operation can be changed accordingly, it possible to eliminate needless calculation and, hence, to shorten calculation time.

Further, in accordance with this embodiment, owing to the fact that the information representing sensing of focus is the number of times focus is sensed, the method of downsampling data used in the correlation operation can be changed in dependence upon the number of times focus is sensed. In case of the initial sensing of focus when the probability of a large amount of defocusing is high, downsampling is performed. Downsampling is eliminated as the number of times sensing is performed increases. This makes it possible to eliminate needless calculation and, hence, to shorten calculation time.

Switching Correction Equation

A case in which the S/N ratio of the output signal from the image sensing element (CCD 9 in FIG. 1) is poor will be described.

When the output signal of the image sensing element has a poor S/N ratio, a variance in the plurality of phase differences δ1, δ2, δ3, δ4 used in finding the phase difference δ after a correction increases. If the variance is large in comparison with a phase-shift component due to relative movement between the camera and subject, using the correction calculation equation (2) to obtain the phase difference δ after correction is inappropriate since only the weighting of δ2 and δ3 will be large.

Accordingly, a first example of switching of the correction calculation equation is such that if the S/N ratio exceeds a predetermined value, the correction calculation equation (2) is made Equation (3) below, in which the arithmetic mean of the plurality of phase differences δ1, δ2, δ3, δ4 is adopted as the phase difference δ after correction.

$$\delta=(\delta1+\delta2+\delta3+\delta4)/4 \quad (3)$$

The results of automatic exposure for auto focus are used as means for judging the S/N ratio of the output signal from the image sensing element.

Automatic exposure for auto focus is performed using the signal of an area that same as that used in sensing of focus before the left image 1 of the phase-difference detecting signal is captured, namely in an optical state identical with that when the focal-point sensing diaphragm 3 is inserted into the optical path of the taking lens, the right pupil 3*b* of the lens is blocked by the light shield 5, the optical image comprising the ray bundle that has passed through the left pupil 3*a* of the lens is formed on the CCD and the phase-difference detecting signal is captured. The output signal of the CCD is subjected to processing similar to the processing for obtaining the phase-difference detecting signal. If the exposure level found from this signal is lower than a predetermined value, the exposure conditions are changed.

In pupil time-sharing phase-differential auto focus, the focal-point sensing diaphragm 3 is inserted into the optical path of the taking lens. During capture of the phase-difference detecting signal, therefore, the F-number is fixed and cannot be changed. This means that adjustment of exposure is performed by adjusting storage time in the CCD and output gain of the CCD. If the adjustment time is longer than a predetermined time, however, there will be cases where there a deleterious effect upon sensing of focus even phase-difference detection error to due relative movement between the camera and subject is corrected by Equation (2). Consequently, there are instances where the adjustment of exposure is carried out by adjusting the output gain of the CCD.

Thus, in a case where the exposure adjustment is performed by the output gain of the CCD, the S/N ratio of the image is degraded when the gain is raised. Accordingly, in a case where the result of automatic exposure for auto focus is darker than a predetermined value in comparison with proper exposure, the image obtained will have a poor S/N ratio. In such cases, therefore, a decision is made to the effect that the image will be one having a poor S/N ratio.

More specifically, in a case where the exposure of the phase-difference detecting signal is less than proper exposure, the image obtained by the CCD will be dark and will exhibit a poor S/N ratio. Accordingly, in a case where the phase-difference detecting signal is captured under such dark conditions, it is judged that the S/N ratio is poor and the correction calculation equation is switched from Equation (2) to Equation (3).

The amount of lens feed necessary for achieving the in-focus state is found from the thus obtained phase difference δ, which has been corrected for relative movement between the camera and subject, focus control of the optical system is performed accordingly and the in-focus state is achieved by repeating the sensing of focus until the amount of defocusing falls below a predetermined allowed amount. The picture is then taken.

In the case of a camera system in which the amount of defocusing falls below a predetermined allowed amount by the first focus sensing operation and control of optical system focus, the picture may be taken without performing sensing of focus a second time for the purposes of verification.

After the in-focus state is thus achieved, the focal-point sensing diaphragm 3 is withdrawn from the optical path of the taking lens and then the picture is taken. In order to record the image, the data is read out of the CCD, subjected to image signal processing by the digital signal processor 12 and, if necessary, subjected to processing such as image data compression. The resulting image is recorded on a recording medium via the card slot 13.

This image data is subjected to video processing by the digital signal processor 12 in order to be displayed in the viewfinder. The processed data is displayed in viewfinder 18 via the VRAM 21. The photographer can thus check the image of the subject.

Though a method of using the results of automatic exposure for auto focus has been described in this embodiment as a method of evaluating the S/N ratio of the output signal from the image sensing element, the S/N ratio may be evaluated using the last results of sensing focus. In a case where the variance of a plurality of previous phase differences δ1, δ2, δ3, δ4 exceeds a predetermined value, it is judged that the S/N ratio is poor and the correction calculation equation is changed from Equation (2) to Equation (3).

Further, the S/N ratio may be evaluated based upon a change in the corrected phase difference δ, which is the result of sensing focus the preceding time. If the result of sensing focus does not converge to fall within the allowable amount of defocusing regardless of repeating the sensing of focus a prescribed number of times or more, there are occasions where the cause is a poor S/N ratio. In such cases the correction calculation equation is changed from Equation (2) to Equation (3).

A second example of switching the correction calculation equation according to this embodiment will now be described.

This second example of switching the correction calculation equation in such that when the output signal of the image sensing element exhibits a poor S/N ratio, the number of times the phase-difference detecting signal used to obtain the phase difference δ is captured is increased.

Only the differences between this method of switching the correction calculation equation and the first example of the switching method will be described.

When the output signal of the image sensing element has a poor S/N ratio, a variance in the plurality of phase differences δ1, δ2, δ3, δ4 used in performing the correction calculation increases. The precision with which focus is sensed declines as a result. Accordingly, if the number of captures of the phase-difference detecting signal necessary for obtaining a plurality of phase differences is increased, the number of phase differences is increased and the average value thereof is found as the corrected phase difference δ, then it possible to suppress a decline in focus sensing precision due to a large variance.

Accordingly, when S/N ratio is judged to be poor from the results of automatic exposure for auto focus or from the preceding results of sensing focus, the number of times the phase-difference detecting signal is captured is increased to ten times from the usual five, images L1, R2, L3, R4, L5, R6, L7, R8, L9, R10 for which the pupil has been switched in a time series are captured and phase differences δ1–δ9 between L1 and R2, R2 and L3, L3 and R4, R4 and L5, R5 and L6, L6 and R7, R7 and L8, R8 and L9, L9 and R10, respectively, are obtained. The arithmetic mean of the plurality of phase differences is adopted as the corrected phase difference δ, as indicated by correction calculation equation (4) below.

$$\delta=(\delta1+\delta2+\delta3+\delta4+\delta5+\delta6+\delta7+\delta8+\delta9)/9 \quad (4)$$

Though a case in which the number of times capture is performed is increased from five to ten has been described, the number of captures is not limited to this number.

Thus, in accordance with the switching of the correction calculation equation of this embodiment, as described above, the calculation equation for obtaining the amount of defocusing from a plurality of phases is changed in dependence upon the output of the image sensing element. For example, when the S/N ratio is poor, the arithmetic means of the plurality of phase differences is changed. As a result, a decline in the precision with which focus is sensed can be suppressed.

Further, by increasing the number of times an image for obtaining the phase difference is captured, it is possible to suppress the effects of a variance in a plurality of phase differences caused by poor S/N ratio and a decline in the precision with which focus is sensed can be reduced.

It should be noted that the system comprising the functional blocks in FIG. 1 may be implemented by hardware or by a microcomputer system comprising a CPU and memory. When implementation is by a microcomputer system, the memory constitutes a storage medium according to the present invention and a program for executing the above-described processing is stored on this storage medium. A semiconductor memory such as a RAM or ROM, an optical disk, a magneto-optic disk or a magnetic medium may be used as the storage medium and these may be used in the form of a CD-ROM, floppy disk, magnetic tape or non-volatile memory card, etc.

The present invention is not limited to the above-embodiments and various changes and modifications can be made within the spirit and scope of the present invention. Therefore, to apprise the public of the scope of the present invention, the following claims are made.

In the embodiment described above, the left and right pupils are opened alternately in order to detect phase difference. However, the present invention is applicable also to an arrangement in which, rather than the left and right pupils being opened alternately, the respective ray bundles from the left and right pupils are received simultaneously by image sensing elements at different positions in the imaging plane.

Further, phase detection in the present invention is applicable in schemes other than the autotely, the respective ray bundles from the left and right pupils are received simultaneously by image sensing elements at different positions in the imaging plane.

Further, phase detection in the present invention is applicable in schemes other than the auto focus scheme.

Further, all or part of the claims or embodiments may form a single apparatus, an entity to be combined with another apparatus, or an element constituting an apparatus.

Further, the present invention is applicable to various types of cameras such as a video movie camera, a video still camera, a camera that uses a silver-halide film and has an image sensing element for capturing a photographic image, a lens-shutter camera and a surveillance camera; image sensing devices, optical devices and other devices besides cameras; devices applicable to these cameras, image sensing devices and other devices; and elements constituting these devices.

What is claimed is:

1. An apparatus comprising:

an image sensing device for receiving light from an object, said image sensing device having a plurality of pixels for receiving light from the object upon separating the light into respective ones of different color components, and said image sensing device outputting a signal based on the light from the object;

an optical guidance device for accepting light rays in different directions from a same part of the object and guiding the light rays to said image sensing device; and a phase-difference determining device for determining a phase difference in an output signal of said image sensing device with respect to each of the light rays accepted in the different directions by said optical guidance device, said phase-difference determining device determining the phase difference based upon a signal obtained by combining output signals of pixels, among said plurality of pixels, that correspond to prescribed different color components, wherein said phase-difference determining device performs addition and averaging phase-differences of a pair of objects obtained in different timings and changes each weighting for adding a plurality of said phase-differences based on a determination result of a S/N ratio of said output signal of said image sensing device with respect to each of the light rays accepted in the different directions by said optical guidance device.

2. The apparatus according to claim 1, further comprising: a signal processor for processing an output signal of said image sensing device to an image signal for photography;

wherein said phase-difference determining device determines the phase difference based upon an output signal of said image sensing device not subjected to the processing by said signal processor.

3. The apparatus according to claim 1, further comprising a signal processor for processing an output signal of said image sensing device to an image signal for photography;

wherein the combining is performed based upon output signals of the pixels not subjected to the processing by said signal processor.

4. The apparatus according to claim 1, further comprising a focusing device for focusing an imaging optical system based upon results of determination by said phase-difference determining device.

5. The apparatus according to claim 1, wherein said phase-difference determining device performs addition as the combining of the output signals of pixels.

6. The apparatus according to claim 1, wherein said phase-difference determining device performs addition and averaging as the combining of the output signals of pixels.

7. The apparatus according to claim 1, wherein said phase-difference determining device applies weighting to the output signals of the pixels corresponding to the prescribed color components when the combining of the output signals is performed.

8. The apparatus according to claim 7, wherein said phase-difference determining device changes a method of applying weighting in dependence upon an illuminating light illuminating the object.

9. The apparatus according to claim 1, wherein said optical guidance device selectively performs the guidance, to said image sensing device, of light rays accepted in different directions from the same part of the object.

10. The apparatus according to claim 1, wherein said optical guidance device selectively and repeatedly performs the guidance, to said image sensing device, of light rays accepted in different directions from the same part of the object.

11. The apparatus according to claim 1, wherein said optical guidance device includes a movable portion for selectively performing the guidance, to said image sensing device, of light rays accepted in different directions from the same part of the object.

12. The apparatus according to claim 1, wherein said phase-difference determining device selects pixels used in determining said phase difference from among said plurality of pixels.

13. The apparatus according to claim 1, wherein said phase-difference determining device selects pixels, which are used in determining the phase difference, from among said plurality of pixels in dependence upon photographic conditions.

14. The apparatus according to claim 1, wherein said phase-difference determining device employs a plurality of calculation methods used in the determination of phase difference.

15. The apparatus according to claim 1, wherein said apparatus is an optical apparatus.

16. The apparatus according to claim 1, wherein said apparatus is a camera.

17. An apparatus comprising:

an image sensing device for receiving light from an object;

a signal processor for processing an output signal of said image sensing device, which has received the light from the object, to an image signal for photography;

an optical guidance device for accepting light rays in different directions from a same part of the object and guiding the light rays to said image sensing device; and a phase-difference determining device for determining a phase difference in an output signal of said image sensing device with respect to each of the light rays accepted in the different directions by said optical guidance device, said phase-difference determining device determining the phase difference based upon an output signal of said image sensing device not subjected to the processing by said signal processor wherein said phase-difference determining device performs addition and averaging phase-differences of a pair of objects obtained in different timings and changes each weighting for adding a plurality of said phase-differences based on a determination result of a S/N ratio of said output signal of said image sensing device with respect to each of the light rays accepted in the different directions by said optical guidance device.

18. The apparatus according to claim 17, wherein said image sensing device has a plurality of pixels for receiving light from the object upon separating the light into respective ones of different color components.

19. The apparatus according to claim 17, further comprising a focusing device for focusing an imaging optical system based upon results of determination by said phase-difference determining device.

20. The apparatus according to claim 17, wherein said optical guidance device selectively performs the guidance, to said image sensing device, of light rays accepted in different directions from the same part of the object.

21. The apparatus according to claim 17, wherein said optical guidance device selectively and repeatedly performs the guidance, to said image sensing device, of light rays accepted in different directions from the same part of the object.

22. The apparatus according to claim 17, wherein said optical guidance device includes a movable portion for selectively performing the guidance, to said image sensing device, of light rays accepted in different directions from the same part of the object.

23. The apparatus according to claim 17, wherein said image sensing device has a plurality of pixels for receiving light from the object, and said phase-difference determining device selects pixels used in determining said phase difference from among said plurality of pixels.

24. The apparatus according to claim 17, wherein said image sensing device has a plurality of pixels for receiving light from the object, and said phase-difference determining device selects pixels, which are used in determining the phase difference, from among said plurality of pixels in dependence upon photographic conditions.

25. The apparatus according to claim 17, wherein said phase-difference determining device employs a plurality of calculation methods used in the determination of phase difference.

26. The apparatus according to claim 17, wherein said apparatus is an optical apparatus.

27. The apparatus according to claim 17, wherein said apparatus is a camera.

* * * * *